Jan. 28, 1947.    K. R. MALTBY    2,414,826
AUTOMATIC MACHINE TOOL
Filed May 29, 1944    10 Sheets-Sheet 1

INVENTOR
KENNETH R. MALTBY
BY Barthel & Bugbee
ATTORNEYS

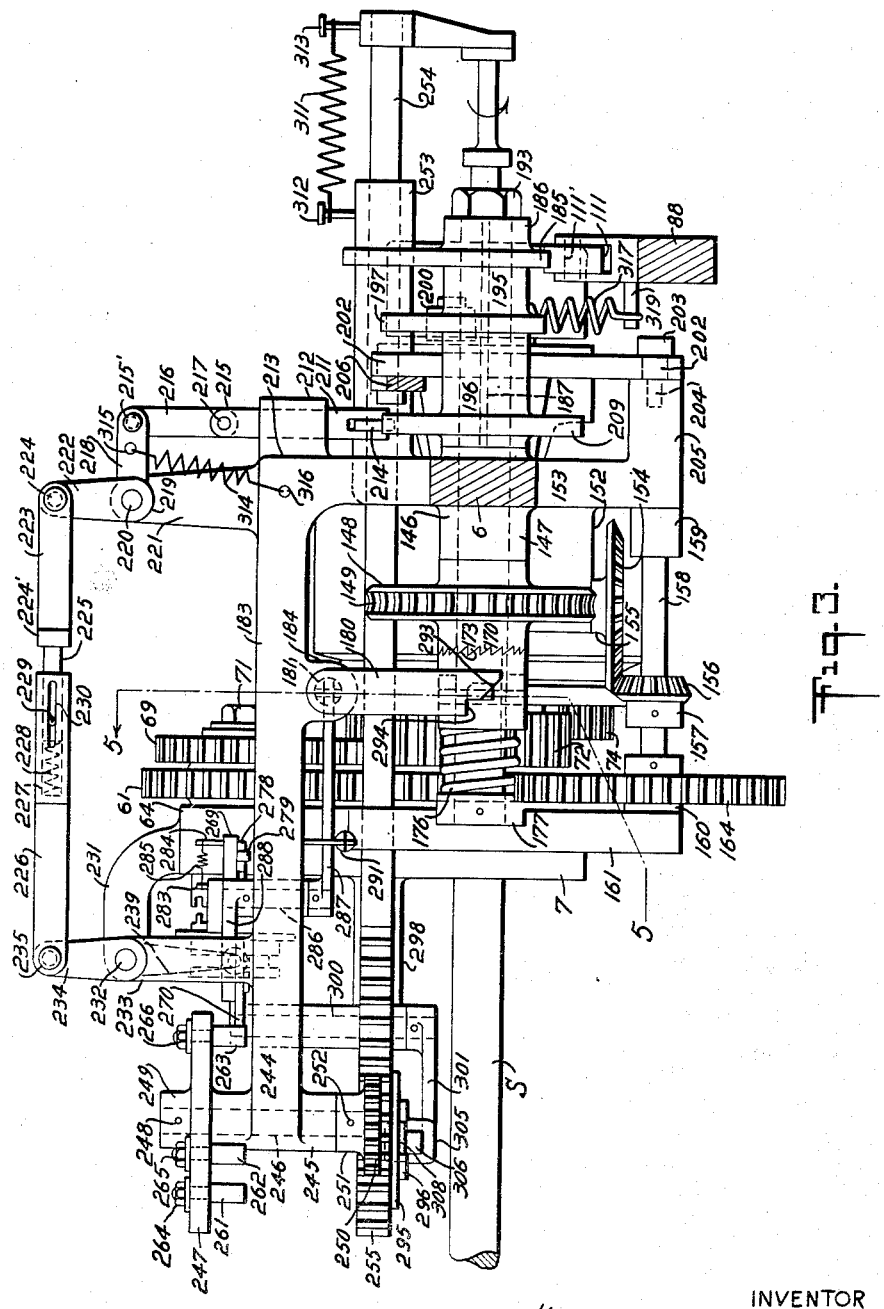

Jan. 28, 1947.    K. R. MALTBY    2,414,826
AUTOMATIC MACHINE TOOL
Filed May 29, 1944    10 Sheets-Sheet 4
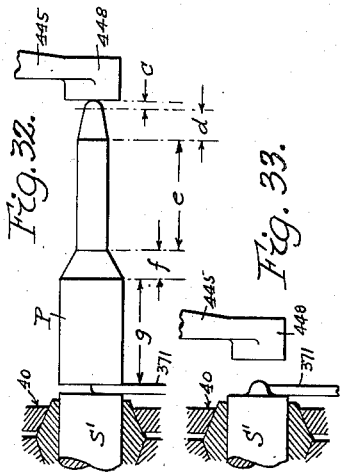
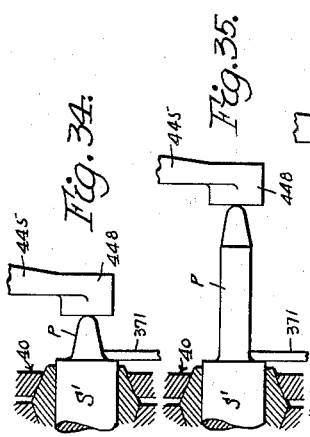
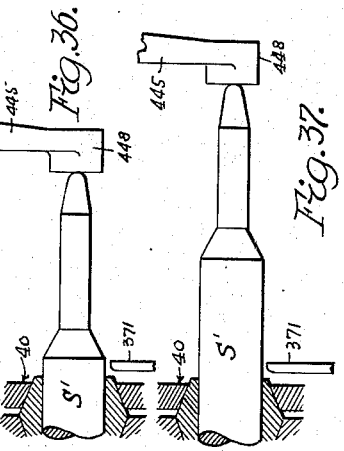
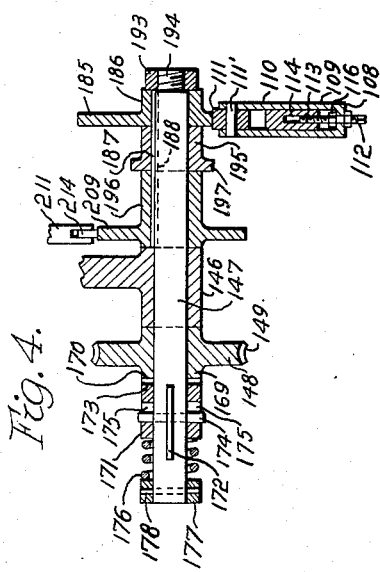
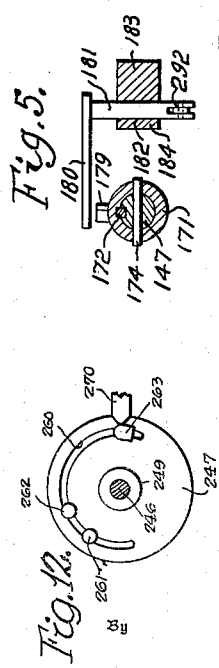
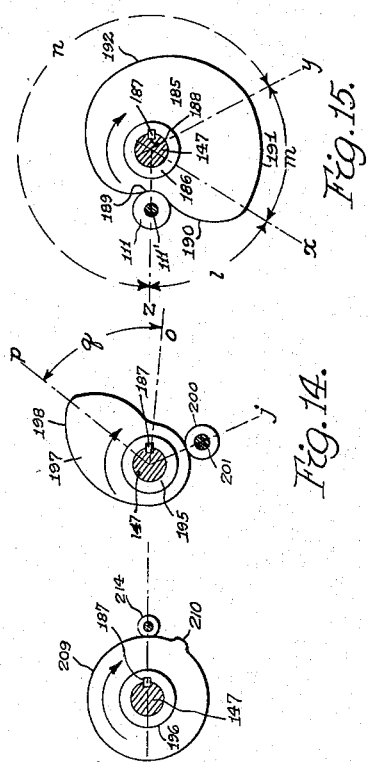
Inventor
Kenneth R. Maltby
Barthel & Bugbee
Attorneys Jan. 28, 1947. K. R. MALTBY 2,414,826
AUTOMATIC MACHINE TOOL
Filed May 29, 1944 10 Sheets-Sheet 5
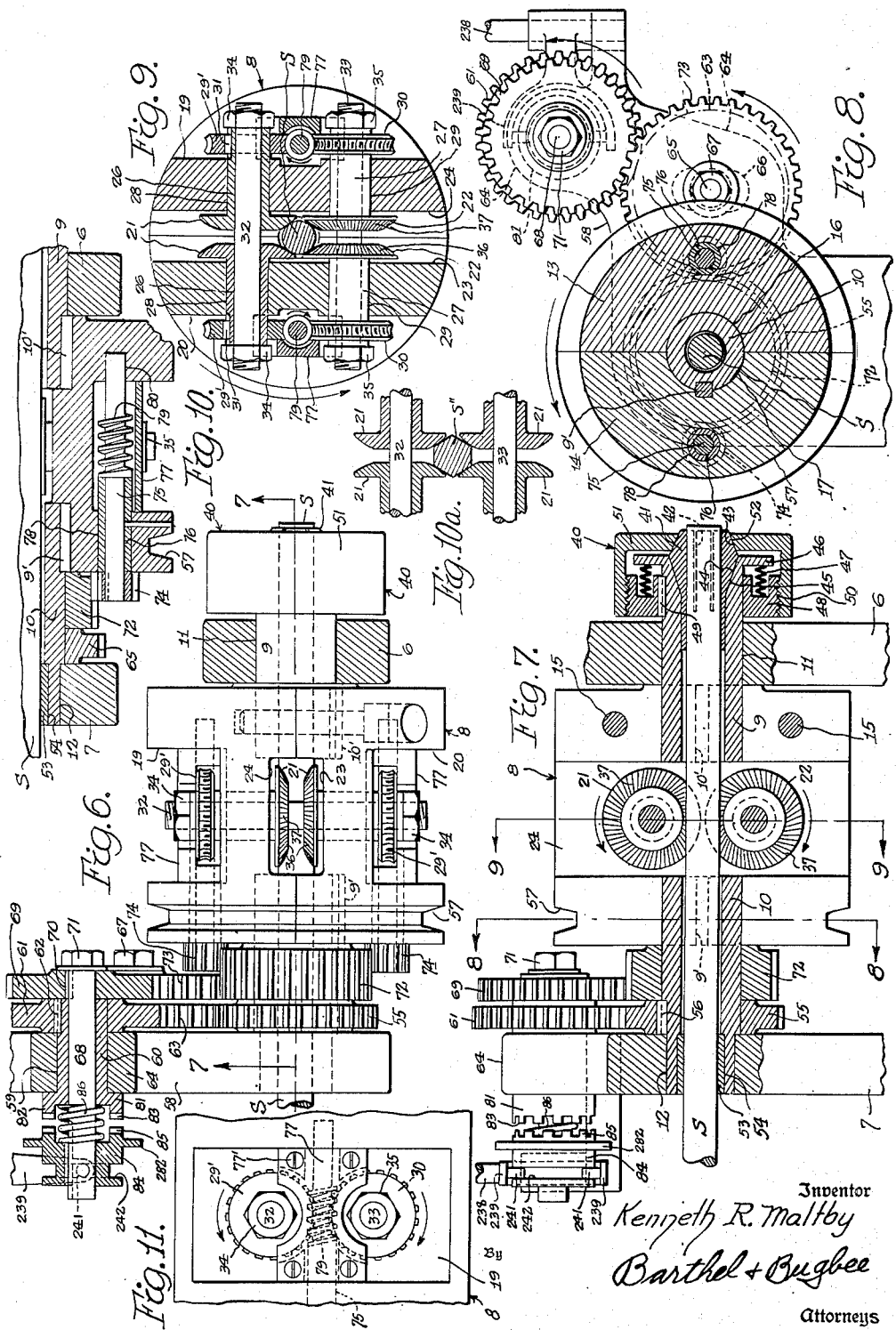
Inventor
Kenneth R. Maltby
Barthel + Bugbee
Attorneys

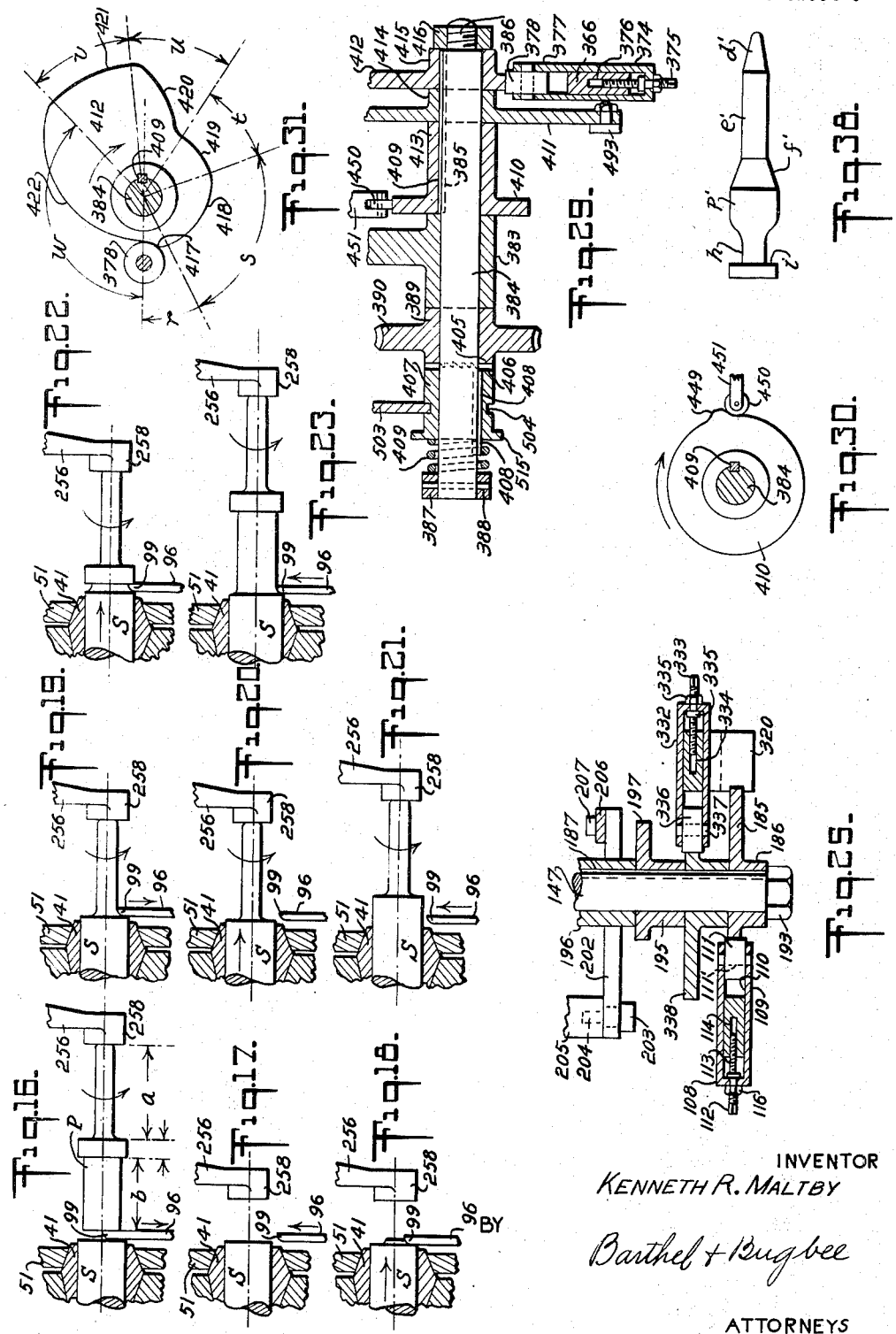

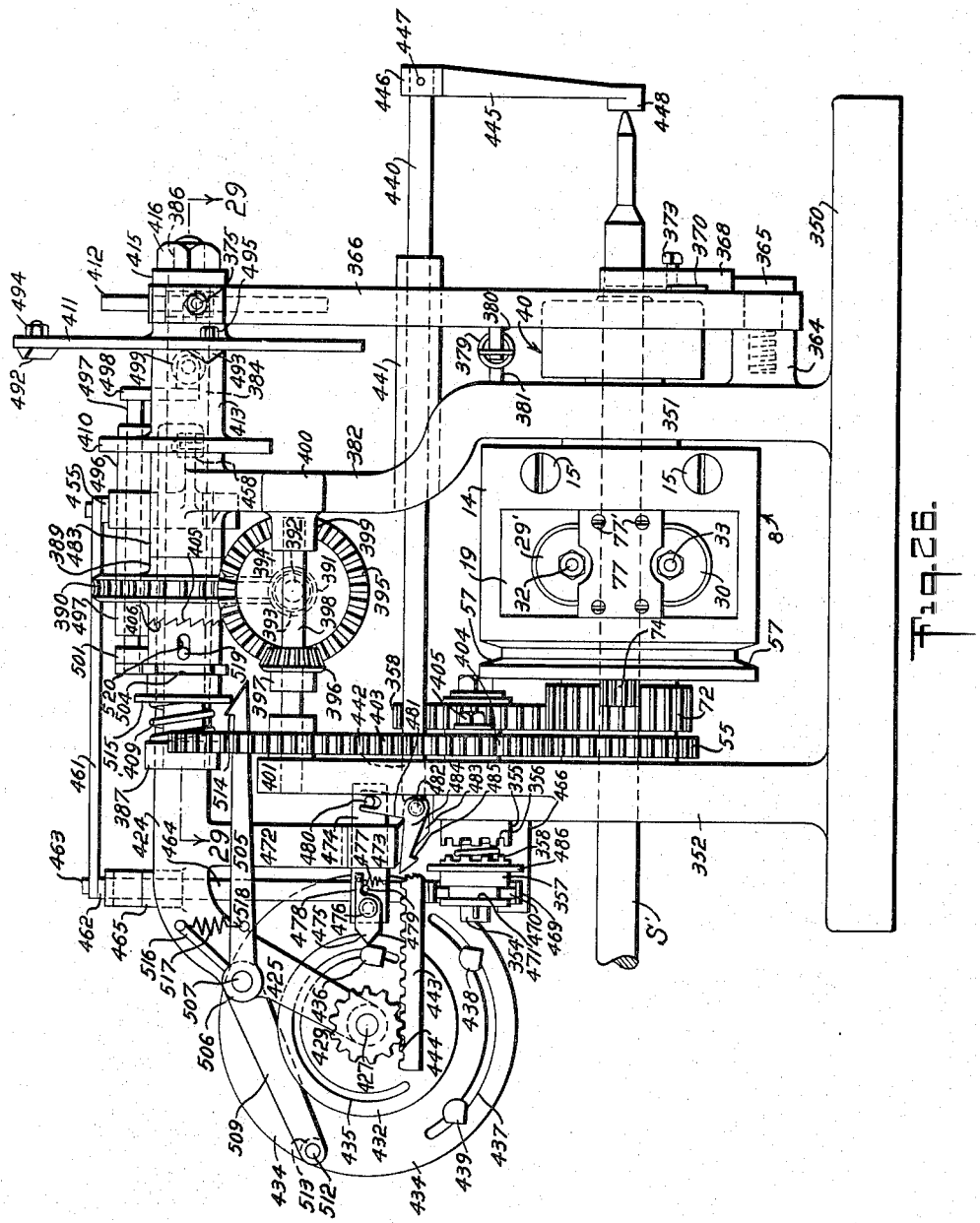

Jan. 28, 1947.　　K. R. MALTBY　　2,414,826
AUTOMATIC MACHINE TOOL
Filed May 29, 1944　　10 Sheets-Sheet 9

INVENTOR
KENNETH R. MALTBY

BY

Barthel & Bugbee

ATTORNEYS

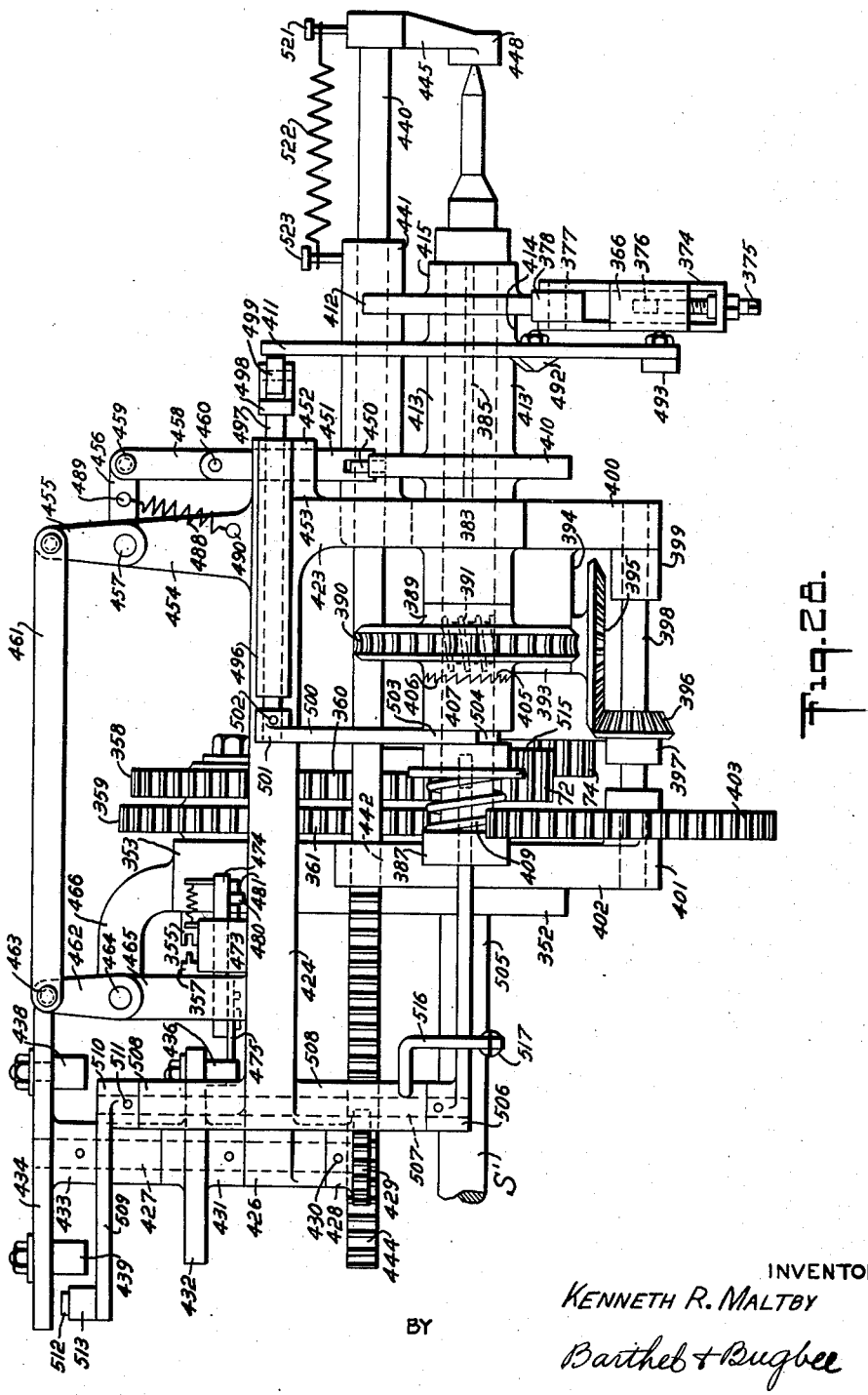

Patented Jan. 28, 1947

2,414,826

UNITED STATES PATENT OFFICE 2,414,826

AUTOMATIC MACHINE TOOL

Kenneth R. Maltby, Garden City, Mich.

Application May 29, 1944, Serial No. 537,829

21 Claims. (Cl. 82—2)

1

The present invention relates to automatic machine tools, and more particularly, to a machine tool for the production of articles of manufacture from elongated stock of round, square or polygonal cross section.

The primary object of the invention is to provide an automatic machine tool of the above-mentioned type in which the round, square or polygonal stock is fed by a feed mechanism operable in timed relation to the movement of cutting members so as to shape, profile and cut said stock in various lengths at a point in close proximity to the point of stock feed.

Another object of the invention is to provide a machine tool which is entirely automatic in operation and is adapted to receive elongated stock of round, square or polygonal cross section in a longitudinal direction so that said stock may be operated upon to shape various forms and profiles thereon and cut in suitable predetermined lengths by movable cutters movable toward and away from the stock at right angles to the direction of feed.

Another object of the invention is to provide an automatic machine tool in which the elongated stock is fed through a chuck or collet with the movable cutting members located in close proximity to the chuck or collet to eliminate lateral movement of the stock when the cutting members are moved into engagement therewith, whereby a high degree of efficiency and accuracy may be obtained and a finished product produced of great accuracy and precision.

Another object of the invention is to provide an automatic machine tool for mass-producing profiled work pieces of various predetermined lengths through a series of continuous operations from elongated stock of round, square or polygonal cross section of different dimensions without the necessity of materially altering the feed mechanism and rotary feed members thereof.

Another object of the invention is to provide a machine tool in which the various movements of the cutting members are controlled by rotary cam members operable in timed relation to the feed mechanism to permit the turning and cutting of said stock and the formation of profiled work pieces of different dimensions with a high degree of accuracy and precision.

Another object of the invention is to provide an automatic machine tool for the mass production of relatively small work pieces in which the sequence of the various feed and cutting operations is such that they are timed and correlated one with the other to produce profiled work pieces

2 of predetermined shape and length without requiring the employment of highly skilled and trained labor.

Another object of the invention is to provide an automatic machine tool in which the movable cutting members are positioned in such a manner and governed by cam means located a considerable distance from the cutting members to increase the degree of accuracy and insure the turning and cutting of the work pieces to dimensions of exact size and shape.

Another object of the invention is to provide a machine tool of the above-mentioned character in which the movable cutting members are movable toward and away from the elongated stock at a point adjacent the feed mechanism and as close thereto as possible to avoid variation and inaccuracies in the work pieces and to provide limiting stops for controlling the inward movement of the cutting members, which stops are controlled in timed relation to the feed mechanism and movable cutters to enable said cutting members to be repositioned at various intervals either during the feed of the stock or when the feed mechanism is arrested for producing various shapes and contour surfaces on the stock during the turning thereof.

Another object of the invention is to provide an automatic machine tool of the above-mentioned character in which the various clutch mechanisms for controlling the feed mechanism and cutting mechanisms are governed by cam means so that the feed mechanism will be started and stopped in timed relation to the movement of the cutting members and thereby carry out a series of cutting operations on the stock without necessitating the manual handling thereof except to remove said work piece from the machine after it is completed.

Another object of the invention is to provide an automatic machine tool in which there is provided a control link engageable with the end of the stock and movable therewith between certain limits of movement so as to cause the cessation of the feed mechanism after the stock has been fed and operated upon for a predetermined portion of its length.

Other objects and advantages of the invention will become apparent during the course of the following description of the accompanying drawings, wherein:

Figure 3 is a horizontal cross sectional view taken on the line 3—3 of Figure 1 looking in the direction of the arrows and illustrating the various control mechanisms and the linkage therefor between the cam mechanisms and clutch mechanisms for causing the feed, movement of the cutting members and control of the cam mechanisms in timed relation so as to produce the sequence of operations desired;

Figure 4 is a horizontal cross sectional view taken on line 4—4 of Figure 1 looking in the direction of the arrows and illustrating the cam members positioned on the drive shaft therefor and the clutch mechanisms for rotating said shaft at periodic intervals;

Figure 5 is a vertical cross sectional view taken on line 5—5 of Figure 3 looking in the direction of the arrows showing the trip mechanism for disengaging the cam shaft clutch from the drive thereof so as to arrest rotation of the cam members after a 360 degree angular movement thereof;

Figure 6 is a top plan view of the feed mechanism illustrating portions thereof broken away to illustrate the manner in which the longitudinal feed mechanism is arrested and started by the control clutch therefor;

Figure 7 is a vertical cross sectional view taken on line 7—7 of Figure 6 looking in the direction of the arrows and showing the feed rollers of the feed mechanism in engagement with the elongated stock and also illustrating the manner in which the stock is frictionally gripped and held by the feed collet at the end of said stock;

Figure 8 is a transverse cross sectional view taken on line 8—8 of Figure 7 looking in the direction of the arrows to show the manner in which the feed mechanism control clutch is drivingly connected to the feed mechanism;

Figure 9 is a transverse cross sectional view taken on line 9—9 of Figure 7 looking in the direction of the arrows and illustrating the feed rollers for engaging elongated stock of regular or irregular cross section and showing the drive mechanism for said feed rollers to permit simultaneous rotation of said feed mechanism and the feeding of the stock therethrough;

Figure 10 is a diametrical cross sectional view taken through a portion of the feed mechanism illustrating the worm drive for opposed sets of feed rolls and the manner in which said worm drives are driven at a different rate of speed from the rotation of the feed mechanism;

Figure 10a is a cross sectional view similar to Figure 9 illustrating the manner in which an elongated piece of stock of polygonal cross section may be fed through the feed mechanism with the feed roll members in engagement with the opposed surfaces thereof;

Figure 11 is an enlarged fragmentary view of a feed drum illustrating the manner in which the drive worm for the feed rollers is positioned for driving worm wheels secured to the shafts of said feed rollers;

Figure 1:
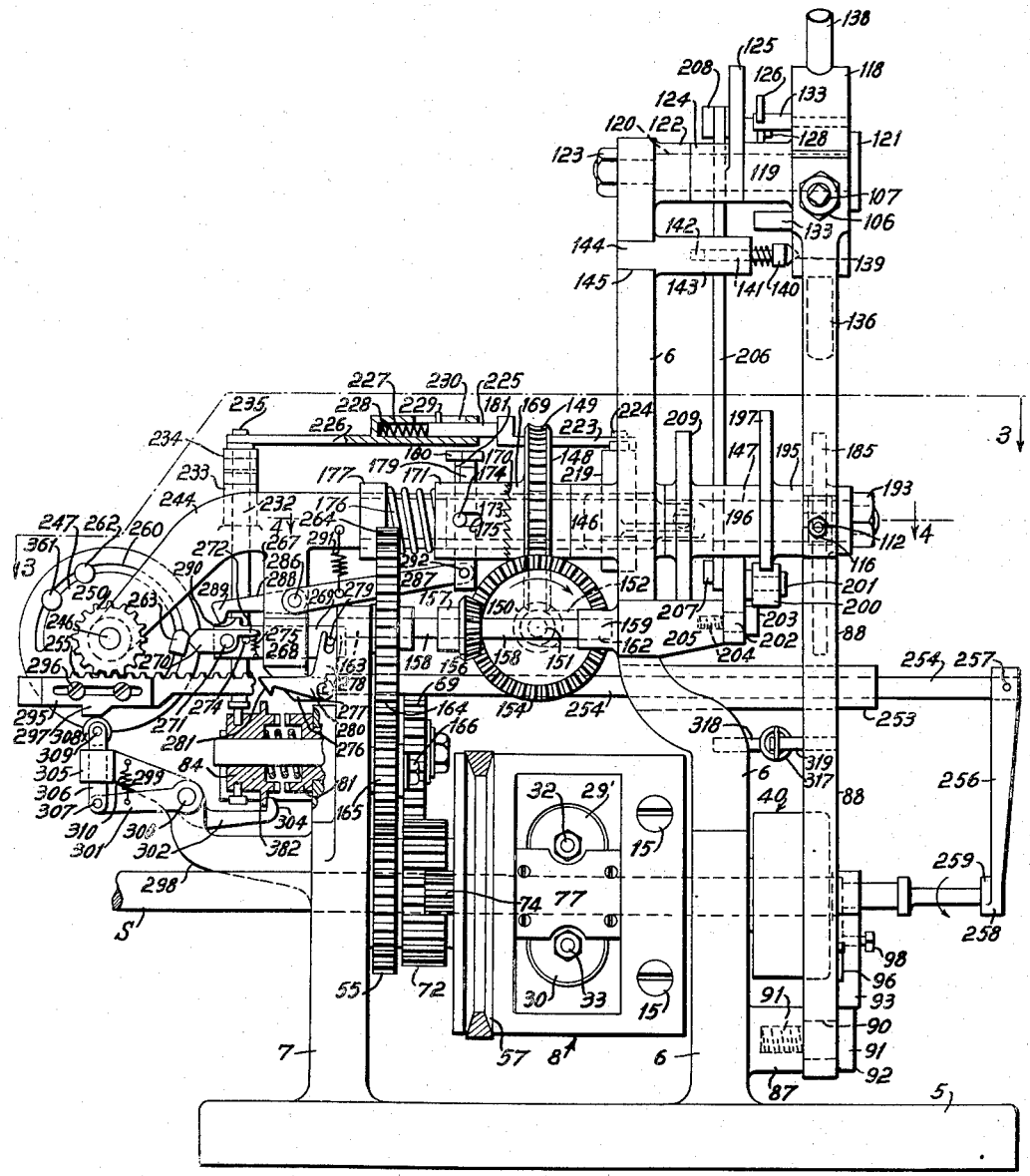
Figure 1 is a front elevational view of the automatic machine tool embodying a preferred form of the invention showing the parts thereof in position for cutting the stock after it has been preformed and turned to the desired shape and contour and after the cutting member has moved inwardly a sufficient distance to sever the work piece from the remaining portion of the stock.
Figure 24:
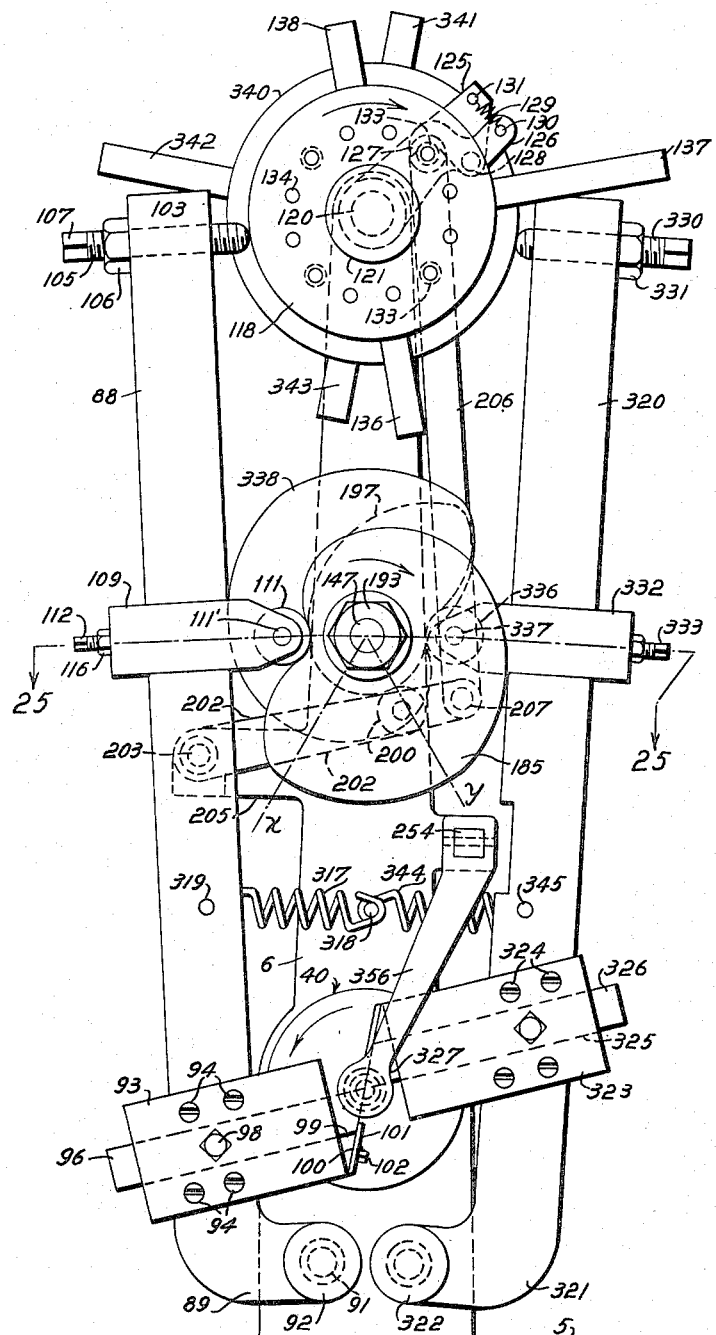
Figure 27:
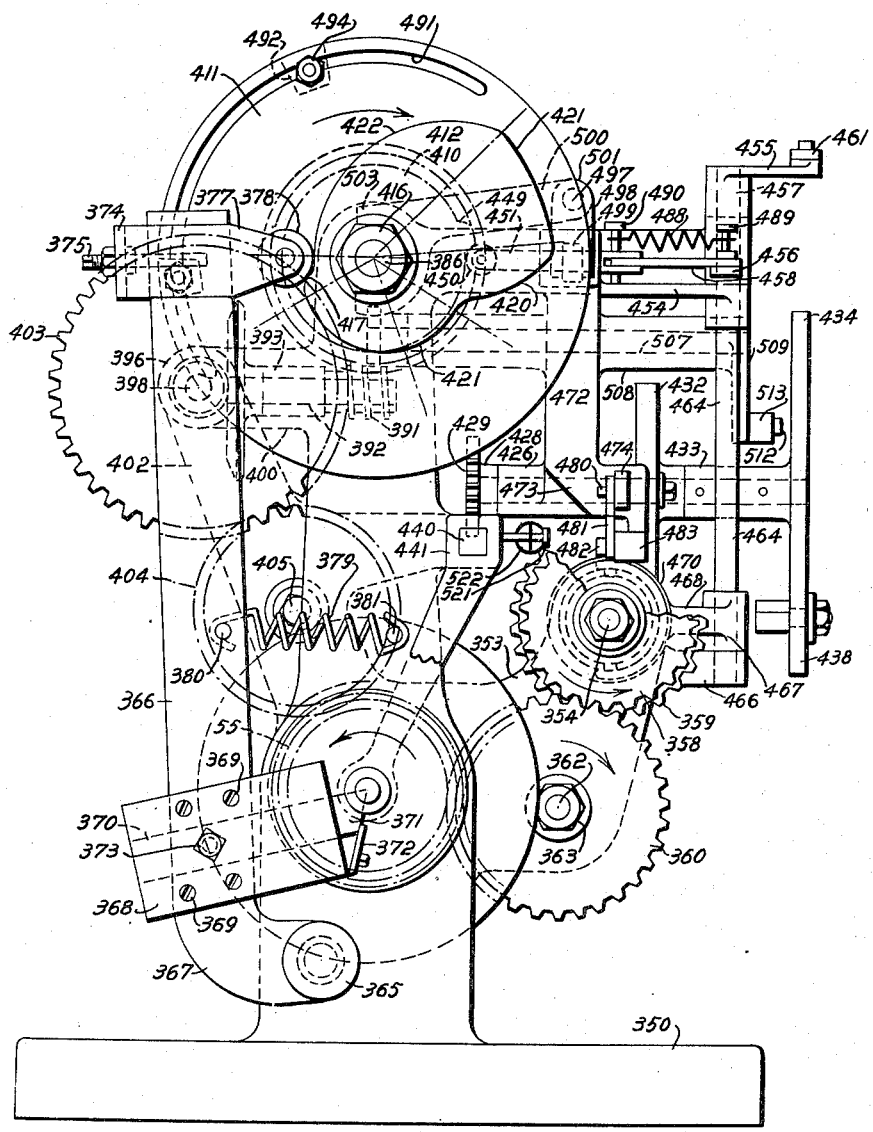

Figure 12 is a fragmentary elevational view of the adjustable camming device for tripping the feed mechanism controlling clutch in timed relation with the stock feed and in the position shown, the adjustable cam controlling mechanism is in engagement with the clutch tripping member to arrest the feed of the stock after the same has been determined and operated upon for a portion of its length and during the cutoff period in which the finished work piece is severed from the remaining portion of the stock;

Figure 13 is a front elevational view of a feed mechanism control cam showing the direction of rotation and the position of the cam roll just after the same has engaged a cam roller carried by the interconnecting control linkage for said feed mechanism clutch;

Figure 14 is a front elevational view of the cam member for operating and controlling the rotary movement of the limiting stop members for governing the limit of to and fro movement of the cutting members;

Figure 15 is a front elevational view of the movable cutting member control cam illustrating the position thereof wherein the cutting member will be at the limit of its innermost movement or a position for severing the finished work piece from the remainder of the stock;

Figure 16 is a fragmentary diagrammatic view illustrating the cutting off operation upon the completion of a finished work piece and the relative positions of the control lengths and movable cutting member at the end of the cutting and turning operation;

Figure 17 is a fragmentary diagrammatic view illustrating the position of the control links and showing the cutting member retracted and out of the path of movement of the stop for being repositioned;

Figure 18 is a fragmentary diagrammatic view illustrating the location of the cutting member after the same has been repositioned by the cutter control cams and the rotary stop members therefor;

Figure 19 is a fragmentary diagrammatic view showing the formation of the work piece and the position of the control links after the stock has been fed a predetermined distance with the longitudinal feed of the stock arrested for permitting withdrawal of the cutting member;

Figure 20 is a fragmentary diagrammatic view showing the position of the movable cutter when being retracted out of the path of movement of the stock during the feed thereof for another portion of the stock feed prior to the feeding of the stock for another portion of its length;

Figure 21 is a diagrammatic fragmentary view with the stock feed arrested and the movable cutting member being moved inwardly during the rotation of said stock to position said cutter for turning another portion of said stock;

Figure 22 is a fragmentary diagrammatic view similar to Figure 21 with the cutting member moved inwardly to a point of controlled movement so that the stock may be fed longitudinally during rotation to turn another portion thereof;

Figure 23 is a fragmentary diagrammatic view similar to Figure 22 showing the longitudinal feed arrested at a point along the stock prior to the inward movement of the cutting member so as to sever said work piece from the remaining portion of the stock as indicated in Figure 16;

Figure 24 is an end elevational view of an automatic machine tool similar to the form of the invention shown in Figures 1 to 23 inclusive with the exception that a pair of cutters is provided and disposed to operate on diametrically opposed sides of the stock;

Figure 25 is a horizontal cross sectional view on line 25—25 of Figure 24 looking in the direction of the arrows and illustrating the cams on the cam shaft of the machine for causing the to and fro movement of the cutters in unison;

Figure 26 is a front elevational view of another modified form of the invention in which the stock is intermittently fed during the to and fro movement of the cutting member to produce the desired profile or contour on the work piece and in which the feed mechanism is arrested during the cutoff operation to sever the finished work piece or product from the remainder of the stock as well as during the formation of various surfaces such as square shoulders;

Figure 27 is an end elevational view of the automatic machine tool shown in Figure 26 illustrating the manner in which the cutting member is moved toward and away from the stock by means of a controlling cam having cam surfaces shaped in accordance with the cutter movement desired to impart the profile on the work piece;

Figure 28 is a top plan view of the modified machine tool shown in Figures 26 and 27 illustrating various structural details thereof and the positions of the various parts at the moment of the cutting off operation and after one complete revolution of the cutter controlling cam;

Figure 29 is a horizontal cross sectional view taken on line 29—29 of Figure 26 looking in the direction of the arrows and showing the cam shaft and the various controlling cams arranged thereon;

Figure 30 is a side elevational view of the feed clutch controlling cam showing the load thereon in position for engaging said clutch and initiating the longitudinal feeding movement of the elongate stock;

Figure 31 is a front elevational view of the cutter controlling cam illustrated diagrammatically to indicate the various positions thereof during the sequence of the cutting or turning operations of the automatic machine tool;

Figure 32 is a fragmentary diagrammatic view of the control link and cutting member or tool showing the various relationships and illustrating diagrammatically the surfaces on the work piece generated by the movement of the cutter controlling cam during the complete revolution thereof with the cutting member shown in its cutoff position at the completion of the work piece;

Figure 33 is a fragmentary diagrammatic view of the control link and cutting tool and showing the relative positions thereof during the initial turning of the work piece with the cutting member repositioned by a partial rotation of the cutter controlling cam;

Figure 34 is a diagrammatic fragmentary view of the control link and cutting member with the cutting tool repositioned for cutting and turning another surface of the work piece;

Figure 35 is a fragmentary diagrammatic view of the control link and cutting tool showing their relative positions after the stop has been turned for a portion of its length and prior to the repositioning or outward movement of the tool to produce a conical surface on said work piece;

Figure 36 is a fragmentary diagrammatic view of the control link and cutting tool showing their relative positions after the conical surface has been turned with the cutting tool moved to a new position out of the path of the stock so that continued feed thereof will provide another surface of the work piece;

Figure 37 is a fragmentary diagrammatic view of the control link and cutting tool prior to the cutoff operation shown in Figure 32; and Figure 38 is a side elevational view of a work piece which has been turned to produce the desired contour in a slightly different fashion by altering the shape of the cam surfaces of the cutter controlling cam.

In the several drawings, attention is first directed to the form of the invention shown in Figures 1 to 23 inclusive wherein there is described a preferred embodiment of the automatic machine tool as well as the feed therefor. It is to be noted that the feed mechanism which will be described in connection with the preferred embodiment of the invention is identically the same as that employed in the other form thereof shown in Figures 24 to 38 inclusive, and so a description of the feed mechanism in connection with the form of the invention in Figures 1 to 23 inclusive will suffice for the various modified forms in the remaining figures.

*General frame structure and feed mechanism*

In the preferred embodiment of the invention in Figures 1 to 23 inclusive, a machine bed or base 5 is provided and said base is formed with spaced vertical standards 6 and 7 adjacent each end thereof. The vertical standards 6 and 7 are adapted to support the various mechanisms of the automatic machine tool and as illustrated in Figures 6 to 10 inclusive, a rotary feed drum or head generally indicated as at 8 is mounted between said standards with the short tubular shaft portions thereof as at 9 and 10 rotatably mounted in bearing openings 11 and 12 in the respective standards 6 and 7. The feed mechanism generally indicated by the reference character 8 comprises a pair of semi-round castings 13 and 14 providing a round feed drum divided diametrically and adapted to be fastened together by means of connecting bolts or the like as at 15 (Figures 6 and 7). The semi-round castings 13 and 14 are cut away as at 16 and 17 respectively for receiving the short tubular shafts 9 and 10 so that when the bolts 15 are tightened in place said tubular shafts will be clampingly engaged between the castings 13 and 14 and tightly held thereby. Keys or the like 9' and 10' are provided for securing the feed drum to the short tubular shafts to rotate therewith.

The semi-round castings 13 and 14 are recessed as at 19 and 20 to provide diametrically opposed flat wall surfaces and cavities of suitable depth to permit the installation of the various feed rolls and gearing therefor so that the same will be confined within the peripheral portion of the feed mechanism 8. A series of feed rolls or discs arranged in opposed pairs 21 and 22 are carried by the castings 13 and 14 with the feed rolls disposed in a diametrically arranged cut away portion formed by complementary recesses 23 and 24 extending transversely to the axis of rotation of said feed mechanism. The feed rolls or discs 21 and 22 are provided with tubular shafts 26 and 27 which extend through bearing openings 28 and 29 respectively in the castings 13 and 14 and each of said tubular shafts 26 and 27 is fitted on the free end thereof with a worm wheel 29' and 30. The worm wheels are held in place on the tubular shaft by means of keys or the like 31 and clamping bolts 32 and 33 extend through the aligned tubular shafts 26 and 27

(Figure 9) and are fitted with nuts 34 and 35 on the threaded ends thereof to retain the worm wheels 29 and 30 in position. The feed rolls or discs 21 and 22 are provided with bevelled surfaces having a series of spaced serrations or grooves 36 and 37 to frictionally grip the rod stock S fed through the short tubular shafts 9 and 10. Said feed rolls or discs 21 and 22 are positioned so that their bevelled peripheral portions will tangentially engage the surfaces of the rod stock and feed the same forwardly upon rotation of said feed discs. A feed collet generally indicated by the reference character 40 is secured to the tubular shaft 9 for frictionally gripping and holding the stock while the same is being operated upon by the various cutter movements and said feed collet 40 comprises a split bushing 41 having longitudinally extending slots 42 extending inwardly from one end thereof and terminating a short distance from the opposite end. Bevelled surfaces 43 and 44 are formed on the bushing 41 adjacent one end thereof and said bushing is fitted with its bevelled surface 44 in contactual engagement with a bevelled or flared mouth portion 45 of the tubular shaft 9.

A flange 46 is formed on one end of the tubular shaft 9 and said shaft is adapted to provide an abutment for a series of coil springs 47 which have their other ends in abutment with a collar 48 keyed to the shaft 9 by means of a key or the like 49. The collar 48 is externally screw-threaded as at 50 for receiving a screw-threaded thimble 51 having a central opening 52 provided with a bevelled surface for engaging the bevelled surface 43 of the expansible collet bushing 41. The collet bushing 41 is expanded by the rod stock S and the various jaws thereof formed by the split sections 42 are yieldingly urged inwardly and tensioned to grip the stock and hold the same centered with respect to the axis of the stock during the feed and cutting operations. The various bevelled surfaces 43 and 44 of the collet bushing are yieldingly engaged by the bevelled surfaces 45 and 52 of the tubular shaft 9 and thimble 51 so as to additionally urge the split jaws of the collet bushing into frictional engagement with the stock. By moving the collet thimble 51 relative to the collar 48 as by turning thereof, the spring tension 47 on said bevelled surfaces may be increased or decreased to suit the various operating conditions and the type of stock being operated upon.

The opposite end of the feed mechanism is adapted to receive the stock S and a bushing 53 is fitted in an enlarged bore 54 of the tubular shaft 10 of substantially the same inner diameter as the stock diameter so as to hold the stock centered with respect to the feed mechanism for the greater portion of its length.

Keyed to the short tubular shaft 10 by means of keys or the like as at 56 is a gear 55 and said gear is adapted to rotate with the feed mechanism upon rotation thereof.

A V-shaped groove 57 is formed in the periphery of the semi-round coastings 13 and 14 to provide a circular pulley groove for receiving a belt 57' adapted to be driven by a suitable motor or the like 58'. Formed integral with the vertical standard 7 and extending rearwardly therefrom is an offset arm 58 having a bearing portion 59 for rotatably receiving a tubular shaft 60. One end of the shaft is provided with a gear wheel 61 keyed thereto by a gib or the like 62 to rotate with the tubular shaft. The gear 61 is spaced from the gear 55 and is adapted to be driven thereby through an intermeshing gear 63 supported on an offset portion 64 of the arm 58. An adjustable shaft 65 is bolted in a slot 66 in said arm and said shaft 65 forms a bearing for the gear 63 and is held in place by means of a nut or the like 67 threaded on one end thereof.

Extending through the tubular shaft 60 is a short shaft 68 having keyed to one end thereof a gear wheel 69 by means of a key or the like 70, and a nut 71 is threaded on one end of the short shaft 68 to retain the gear 69 in place in side by side relationship with the gear 61. It is to be noted that the gears 61 and 69 are of different diameters and constitute a reduction drive for the feed discs 21 and 22 so that said discs will rotate at a slower speed with respect to the speed of the rotary feed castings 13 and 14. The gear 69 is adapted to drive a gear wheel 72 rotatably mounted on the tubular shaft 10 through the medium of the intermeshing gear 73 supported in side by side relationship with the intermeshing gear 63 on the sub shaft 65. Both intermeshing gears 63 and 73 are loosely mounted on said shaft and are adjustable therewith, to compensate for wear and various adjustments. The gear 72 is adapted to mesh with diametrically disposed gears 74 mounted on one end of a rotary shaft 75 disposed in a bushing 76 in a bearing opening 78. The opposite end of the shaft 75 is fitted with a worm 79 and has its extreme inner end received in a bearing opening 80 formed in one wall of the recesses 19 and 20. It will thus be seen that a worm 79 is disposed in each of the recesses 19 and 20 between sets of worm wheels 29 and 30 in driving engagement therewith for rotating the feed discs 21 and 22 in the directions as indicated by the arrows in Figure 7. A cover plate 77 is provided for the worm 79 and worm wheels 29' and 30, and said cover plate is fastened in place by suitable screws or the like 77'.

One end of the tubular shaft 60 is flanged as at 81 and is formed to provide a clutch part 82 having a series of clutch teeth 83 and slidably mounted on the shaft 68 is a clutch collar 84 having a series of clutch teeth 85 adapted to engage the clutch teeth 83 for the purpose of connecting the shafts 60 and 68 and thereby connect the train of gearing including the gears 55, 63, 61, 69, 73 and 72 whereby rotation of the feed discs 21 and 22 will be effected to feed the stock S through the feed drum 8. A coil spring 86 encircles the shaft 68 and has one of its ends in abutting relationship with the clutch part 82 and its other end in abutting relationship with the clutch collar 84 to normally hold said clutch parts disengaged during intervals of machine operation in which it is desired to temporarily arrest the feeding stock S. It will thus be seen that engagement with the clutch parts 81 and 84 will establish a reduction drive between the rotating feed drum 8 and the serrated bevelled feed discs 21 and 22 so as to simultaneously rotate said stock about its axis and feed the same longitudinally in the direction of the feed collet 40. The feed discs 21 and 22 are designed to frictionally grip and feed the stock and at the same time prevent rotation thereof with respect to the feed drum 8.

*Cutting mechanism for form of invention shown in Figures 1 to 23*

Formed integral with the vertical standard 6 is an enlarged boss 87 to which is pivotally attached the lower end of an oscillatable cutting tool supporting arm 88. The lower end of the arm 88 is offset as at 89 and the free end thereof is provided with an opening 90 for receiving a retaining screw 91 having a head portion 92 and an intermediate bearing portion to be received in the bearing opening 90. Affixed to the lower end of the cutting tool supporting arm 88 is a cutter guide plate 93 fastened in place by screws or the like as at 94 and said cutter guide plate 93 is provided on its inner wall with a longitudinal groove 95 for slidably receiving the shank 96 of a cutting tool having a cutting point or edge 97. A set screw 98 is passed through an opening in the cutter guide block 93 so that the inner end of said screw will engage the shank of the oscillatable cutting tool supporting bar and retain the same in position. One end of the cutter guide plate 93 is extended as at 99 and is provided with a bevelled edge 100 for receiving a stop plate 101 which is held in place by a screw or the like 102. The opposite end of the oscillatable cutting tool supporting bar 88 is provided with an enlarged boss 103 having a threaded opening 104 for receiving an adjustable stop screw 105. A lock nut 106 is threaded on the stop screw to lock the same after the screw has been adjusted and the outer end of the stop screw is formed with a polygonal surface 107 to facilitate the application of a wrench or the like. Intermediate the ends of the oscillatable cutting tool supporting bar 88 is an adjustable U-shaped bracket 108 the legs of which as at 109 are adapted to straddle the bar 88 with the free ends thereof 110 extending a slight distance beyond the bar and spaced apart for receiving a cam engaging roller 111 on a short roller pin 111'. Extending through the base portion of the U-shaped clamp 108 is an adjusting screw 112 having the threaded end thereof as at 113 received in a threaded opening 114 extending inwardly from one edge of the oscillatable cutting tool supporting bar 88. Locking nuts 116 are disposed on opposite sides of the U-shaped bracket 108 and are threaded on the adjusting screw 112 so as to lock said screw in an adjusted position in a manner somewhat similar to the locking of the stop screw 105 above described.

Rotatably mounted on the extreme upper end of the vertical standard 6 is a cutter indexing head 118 and said head is provided with a collar portion 119 having a bore therethrough for receiving a pivot pin 120 having a flat head 121 engaging the radial wall of the rotary indexing head 118. The pivot pin is passed through a tubular extension 122 formed on the upper end of the vertical shaft 6 and a nut 123 is threaded on the end thereof as indicated in Figure 1. Interposed between the rotary indexing head 118 and the tubular extension 122 is a rotatable collar 124 having an arm extension 125 to which is pivoted a latch member 126 having a hooked end 127. The latch member 126 is pivoted to an offset portion of the arm extension 125 by means of a pivot pin 128 and said latch pin is of bell-crank formation with the hooked end thereof 127 projecting inwardly toward the axis of the pivot pin 121. A coil spring 129 has one of its ends received in an opening 130 in the latch member 126 and its other end attached to a pin 131 on the free end of the arm extension 125. The hooked end latch member 126 is adapted to engage laterally extending detent pins 133 removably mounted in openings 134 in one radial face of the indexing head 118 so that the detent pins 133 may be removed and repositioned to suit the conditions of the particular cutting operation. The peripheral wall of the indexing head 118 is provided with a series of circumferentially spaced radially extending openings 135 for receiving stop members 136, 137 and 138 of various lengths depending upon the length of inward movement of the cutting tool desired toward the work or stock.

Formed on the other radial wall of the indexing head 118 is a series of circumferentially spaced recesses 139 for receiving a spring-pressed detent plunger 140 which has its reduced shank 141 slidably mounted in a suitable bore 142 extending inwardly from one end of the tubular supporting member 143. The tubular supporting member 143 is flattened at its other end as at 144 for being received in an inwardly cut slot 145 in the extreme upper end of the vertical standard 6. Rotation of the indexing head 118 is accomplished by a suitable cam mechanism which will be hereinafter more fully described, and after said indexing head has been partially rotated, the detent 140 will be received in a correspondingly aligned recess 139 corresponding to the position of one of the stop members 136, 137 and 138.

*Cutter controlling cam mechanism for form of invention shown in Figures 1 to 23 inclusive*

Formed integral with the vertical standard 6 is a tubular bearing boss 146 for rotatably supporting a cam shaft 147 for supporting the various cams for moving the oscillatable cutting tool supporting bar 88 and cutting tool point 97 away from the stop so that the indexing head 118 may be rotated a partial revolution to bring one of the stop members 136, 137 and 138 into engagement with the adjustable stop screw 105. As clearly shown in Figure 4, a worm wheel 148 is mounted on one end of the cam shaft 147 to rotate freely thereon and said worm wheel is provided with a series of worm teeth 149 for drivingly engaging with a worm 150 secured to the end of the drive shaft 151 journalled in a bearing boss extension 152 formed integral with an offset portion 153 of the vertical standard 6. A bevel gear 154 has its hub 155 secured to the worm shaft 151 and said bevel gear is in driving engagement with a bevel gear 156 of smaller diameter than the bevel gear 154, which has its hub 157 secured to a drive shaft 158 therefor. The ends of the drive shaft 158 are journalled in suitable bearing bosses 159 and 160 in the arm extension 153 of the vertical standard 6 and arm extension 161 on the vertical standard 7. One end of the rotary shaft 158 is journaled in the bearing opening 162 while the opposite end is journaled in a similar opening 163. Secured to one end of the rotary shaft 158 is a gear wheel 164 which is mounted directly above an idle gear 165 supported by a bearing screw 166 in the lower portion of the arm extension 161 so that said idle gear 165 will drivingly connect the gear 55 with the shaft 158 and cause rotation thereof upon rotation of the feed head 8, by means of a motor having the belt thereof trained over the pulley groove 57 as above explained. The hub of the worm wheel 148 as at 169 is provided with a series of serrations or clutch teeth 170 for being engaged by a sliding clutch collar 171 which is slidably mounted on the cam shaft 147 and is keyed thereto against rotation relative to said cam shaft by means of a key or the like 172. The clutch collar 171 is provided with a series of clutch teeth 173 for interlocking with the teeth 170 on the collar 169 of the worm wheel 148. A transverse pin 174 is passed through the shaft 147 so that the free ends thereof may operate in diametrically opposed slots 175 in the clutch collar 171 and thereby limit endwise movement of said clutch collar. Encircling the free inner end of the cam shaft 147 is a coil spring 176 one end of which is in abutting relationship with the clutch collar 171 and the opposite end in abutting relationship with a collar 177 rigidly affixed to the cam shaft 147 by means of a transverse pin 178. It will thus be seen that the coil spring 176 will hold the clutch parts 170 and 173 in driving engagement so that rotation of the worm wheel 148 as by means of the shaft 158 and bevel gears 154 and 156 through the worm shaft 151 and worm 150 will normally impart rotation of the cam shaft in the direction of the arrows indicated in Figure 2. Formed integral with the clutch collar 171 is a radially extending projection 179 which is adapted to engage a stop member 180 carried on the upper end of the arm 181 mounted for sliding movement in an opening 182 in an angular arm extension 183 formed integral with the vertical standard 6 and within an offset boss thereof as at 184.

Figure 2:
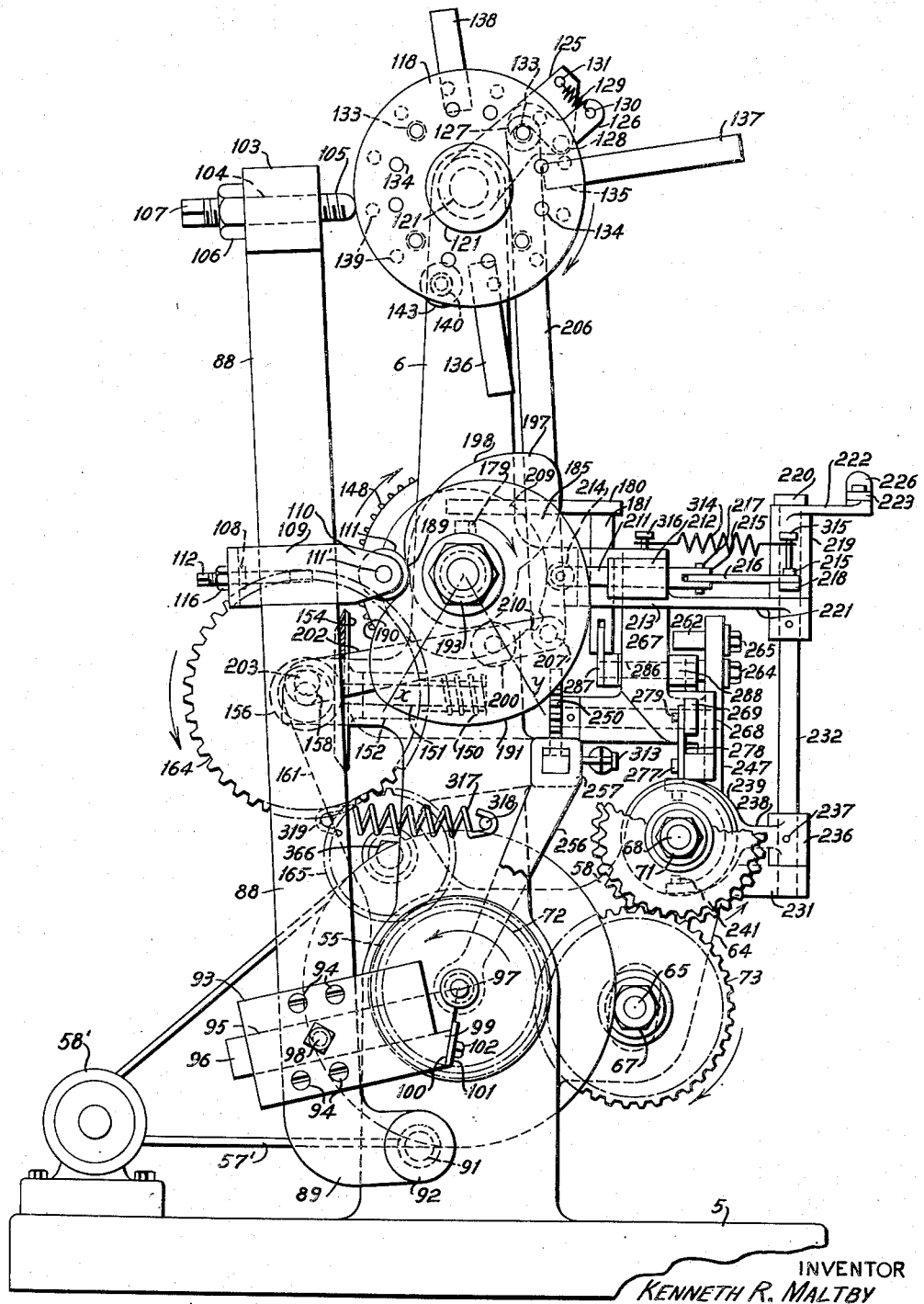
Figure 2 is an end elevational view of the automatic machine tool shown in Figure 1 illustrating the various structural features thereof and the positions of the various cam mechanisms at the end of the final cutting operation.

Mounted on the other end of the cam shaft 147 is a series of cams for initiating the movement of the cutting tool, the movement of the indexing head and the engagement of the clutch parts 82 and 84 of the feed mechanism. The cam for controlling the in and out oscillatory movement of the cutter tool supporting bar 88 is mounted on the outermost end of the cam shaft and said cam 185 has its collar 186 keyed to the shaft 147 against rotation thereon by means of a key 187 received in a slot 188 extending longitudinally of the cam shaft. The cutter bar controlling cam 185 is of cardioid shape and is provided with an indented portion 189 which is adapted to be engaged by the cam roller 111 to permit the cutting tool 97 to travel to the limit of its inward movement. The cam 185 is also provided with a cam surface 190 extending in a counterclockwise direction from the indented portion 189 denoted by the radial line z (Figure 15) to a distance of approximately 30 degrees to the radial line x (Figures 2 and 15). From the radial line x to the radial line y, an angular distance of approximately 60 degrees, the cam surface 191 is of uniform size and radius to provide an idling position on the peripheral surface of the cam in order to hold the oscillatable cutter supporting arm 88 at the limit of its outward travel during the repositioning of the adjustable stop members 136, 137 and 138. The peripheral surface 192 of the cam 185 from the radial line y to the indented portion 189 and radial line z gradually decreases in radius from the center of the cam shaft 147 to the periphery thereof so as to permit the oscillatable cutter tool supporting arm 88 to move inwardly for engagement with one of the stop members 136, 137 and 138 carried by the indexing head 118 after said indexing head has been shifted to a new angular position. The collar 186 of the cam 185 is engaged by a nut 193 threaded on a reduced threaded end portion 194 of the cam shaft so as to retain the cam 185 as well as the other cams thereon in their proper position. The various angular distances between the radial lines z—x, x—y, and y—z are denoted by the respective reference characters l, m and n. (Figure 15.)

Interposed between the tubular bearing portion 146 and the collar 186 of the cam 185 is a pair of cam collars 195 and 196 having grooves in the bores thereof for receiving the longitudinal key 187 so as to lock said collars 195 and 196 securely to the cam shaft. The collar 195 is provided with a cam 197 having an enlarged lobe portion of general lemniscate shape providing an enlarged cam surface 198 for engaging a cam roller 200 supported on a bearing pin 201 adjacent the end of a control lever 202. The cam 197 is shaped between the radial lines o and p to provide an increasing cam surface having an angular distance of approximately 60 degrees denoted by the reference character q (Figure 14). One end of the control lever 202 is pivoted to the frame structure by means of a pivot screw 203 having one end threaded in an opening 204 in a laterally extending portion 205 of the arm extension 153 thereof. The other end of the operating lever 202 is connected to a reciprocating link 206 by means of a pivot pin or the like 207 and the extreme upper end of the reciprocating link 206 is pivoted to the arm extension 125 by means of a pivot pin 208. The pivot pins 207 and 208 may be in the form of machine screws similar to the machine screw 203 with a bearing portion formed intermediate the head thereof and the threaded portion thereof so as to permit free pivotal movement of the operating lever 206 at the point of attachment to the arm extension 125 and operating lever 202. The lobe of the cam 197 is disposed so that rotation of the cam shaft will cause the cam surface thereof to engage the roller 200 and move the reciprocating link 206 downward and impart a partial rotation to the arm extension 125. As this occurs, the hooked end detent 126 engages over one of the detent pins 133 and rotates the indexing head 118 about its axis a predetermined angular distance, so as to move one or the other of the stop pins 136, 137 or 138 into the path of the adjustable stop screw 105 just at the moment before the oscillating arm is being moved inwardly by the gradually decreasing cam surface 192 on the cam 185.

The other cam collar 196 is mounted on the cam shaft 147 and rigidly locked thereto by means of the key 187 and said cam collar is provided with a cam disc 209 for controlling the feed clutch including the clutch parts 82 and 84. The cam disc 209 is formed with a relatively small lobe 210 on the peripheral portion thereof and said lobe 210 is disposed at an angular position slightly in advance of the lobe 197 of the cam 198 so as to engage said clutch parts during the latter part of the period n between the angular distances y and z of the oscillatable cutting tool supporting arm operating cam 185 so that the feed mechanism will be started in motion a slight time interval after the oscillatable cutting tool supporting arm has been moved to the limit of its inward travel. The linkage for controlling the clutch parts 82 and 84 comprises a slide bar 211 slidably guided in a guide boss 212 which is formed integral with the rearwardly extending portion 213 formed integral with the vertical standard 6. The integrated slide guide 212 is offset on the free end thereof directly in alignment with the cam disc 209. The opposite end of the slide 211 is bifurcated as at 215 for receiving a link 216 pivoted thereto by means of a pivot pin 217. The opposite end of the link 216 is pivoted as at 215' to an arm extension 218 formed on the tubular bearing 219 which is rotatably mounted on the upper end of a short pivot pin 220 carried by a suitable bearing bracket or extension 221 formed integral with the rearwardly extending frame arm 183.

Formed integral with the upper end of the tubular bearing bracket 219 is an arm extension 222 having pivoted to the free end thereof a link 223 by means of a pivot pin 224 and it is to be noted that the arm extensions 218 and 222 on the tubular bearing portion 219 are arranged at right angles one to the other so that outward movement of the slide rod 211 will move the link 223 longitudinally of the machine frame. Formed on the free end of the link 223 is an offset portion 224' having a plunger pin 225 which is slidably mounted and telescoped in a bore in the end of an aligned link 226 as indicated in Figure 3. The link 226 is provided with an axial bore 227 for receiving the plunger pin 225 and a coil spring 228 is mounted in said bore so that one end thereof will be engaged in the inner end of the bore and the opposite end in engagement with the end of the plunger pin 225. Secured to the plunger pin 225 is a transverse retaining pin 229 which projects on opposite sides of the plunger pin so as to operate the longitudinal slots 230 in the link 226 and to permit relative movement between the links 223 and 226 when the clutch parts are locked out of engaging relationship during the cutoff operation of the machine tool. Formed integral with the rearwardly extending portion 64 of the vertical standard 7 and offset therefrom is an arcuately curved arm 231 in the free end of which is rotatably journaled a vertical shaft 232. A rearwardly extending arm 233 is formed integral with the frame extension 183 and is formed with a bearing portion at its free end in vertical alignment with the arcuate extension 231 for rotatably supporting the upper end of the shaft 232. Secured to the extreme upper end of the vertical shaft 232 is an operating arm 234 which is pivoted to the link 226 by means of a pivot pin 235. The lower end of the vertical shaft 232 is fitted with a collar 236 held in place by means of a transverse locking pin 237 and formed integral with the collar 236 is a yoke arm 238 having a clutch engaging yoke 239 for embracing the clutch collar 84. The clutch engaging yoke 239 is provided with diametrically disposed pins 241 for being received in an annular groove 242 in the clutch collar 84 in such a manner as to move said clutch collar inwardly toward the clutch part 81 when the cam roller 214 is engaged by the small lobe 210 of the cam disc 209. It is noted that the clutch collar 84 during its inward movement toward the clutch part 81 is under the tension of the coil spring 86 which normally holds said clutch part separated.

It will thus be seen that rotation of the feed head 8 will drive the cam shaft 147 and the various cams thereon will move the oscillatable cutting tool supporting arm 88 slightly in advance of the indexing head 118 so that the indexing head may be positioned to limit the inward movement of the tool when the clutch parts 82 and 84 are engaged by the clutch operating cam 309 whereupon longitudinal feed of the stock S will be started during the simultaneous rotation thereof about its own axis. In order to control the various clutch parts 82, 84, 169 and 171, a cam operator is provided therefor so as to control the various movements of the oscillatable cutting tool supporting bar, indexing head and clutch operating cam so that they may be controlled in timed relation one to the other to perform a sequence of operations in accordance with the contour of the work piece desired.

*Adjustable cam for controlling the feed clutch and cam shaft clutch in Figures 1 to 23*

Extending rearwardly from the frame extension 183 which is integrated with the vertical support 6 is a rearwardly directed downwardly inclined portion 244. Formed integral with the free end of said inclined portion 244 is a tubular bearing 245 for receiving a transverse shaft 246 on one end of which is affixed a cam disc 247 held in place by a suitable locking pin 248 extending through the hub thereof as at 249 while the opposite end of the shaft 246 is provided with a gear wheel 250 having its hub 251 rigidly secured in place by means of a locking pin 252. Slidably mounted in a tubular guide member 253 secured to and extending forwardly from the vertical support 6 is a control link 254 which is rectangular in cross section to prevent rotation thereof in the tubular guide 253 and which is provided on one end with a series of rack teeth 255 for engaging the gear wheel 250 on the horizontal shaft 246. The control link 254 has affixed to the opposite end a work engaging bar 256 one end of which is provided with a socket for receiving said control link 254 and being held thereon by a transverse locking pin 257. The lower end of the work-engaging arm 256 is offset and terminates in an enlarged head 258 providing a work-engaging surface 259. It will thus be seen that work fed through the feed head 8 will engage the head portion 258 of the work-engaging arm 256 and slide said control link 254 to the right while at the same time rotating the gear 250, shaft 246, and cam disc 247.

Formed in the cam disc 247 is a circumferential slot 260 adapted to receive cam pins 261, 262 and 263. The cam pins have one of their ends reduced and screw-threaded for being passed through the circumferential slot 250 so that the projecting ends of the threaded portions may receive retaining nuts 264, 265 and 266. By loosening and tightening the adjusting nuts 264 to 266 inclusive adjustment of the cam pins 261 to 263 inclusive may be facilitated so as to position said pins in a manner which will be presently described for controlling the movement of the cutting tool supporting arm 88 and the indexing head 118.

Formed integral with the rearwardly extending arm portion of the frame extension 183 is a downwardly depending arm 267 terminating at its lower end in a tubular guide member 268 for receiving a sliding bar 269. The sliding bar is provided at one end with a pivoted cam-engaging detent 270 pivotally attached thereto as at 271 to pivot in one direction only. A rearwardly extending projection 272 is formed in the detent 270 for engaging a laterally extending pin 274 so as to prevent swinging movement of said detent upon rotation of the cam disc 247 in a counter-clockwise direction. A coil spring 275 has one of its ends affixed to the extension 272 and its opposite end affixed to the slide bar 269 so as to normally hold said detent in its projected position. Formed integral with the tubular guide 268 is a depending offset arm 276 to which is pivoted a bell-crank lever as at 277 and said bell-crank lever has one of its arms as at 278 bifurcated for receiving a pin 279 extending laterally from the slide rod 269. The other arm of the bell-crank lever as at 280 is provided with a hooked end 281 for engaging over an annular flange 282 on the clutch collar 84 so as to hold the clutch parts 82 and 84 in driving engagement. The sliding bar 269 is adapted to be projected in the direction of the rotary cam disc 247 and in order to accomplish this, a pin 283 is secured to the rear portion of the tubular guide boss 268 and directly in line therewith on the sliding bar 269 is affixed a pin 284. A coil spring 285 has its ends affixed to said pins 283 and 284 so as to place said bar 269 under tension and normally urge the same in the direction of the cam disc. Extending through an opening in the depending arm 267 is a pivot pin 286 having secured to one end thereof an extension link 287 while the other end is provided with a hooked latch lever 288 having a hooked end 289. The hooked end of the latch lever 288 is adapted to engage a cam projection 290 on one end of the slide bar 269 so as to rock said latch lever 288 about its pivot point 286 when the sliding bar 269 is in its projected position. A coil spring 291 has one of its ends hooked in an opening in the extension lever 287 and its opposite end received in an opening in the rearwardly extending frame portion 243 to place the lever under tension and normally hold the lever extension 287 in an elevated position. The extension link 287 has its free end pivotally attached to the bifurcated end of the sliding trip 181 by means of a pivot pin 292 so that oscillation of said extension arm 287 will raise and lower said tripping arm 180 into and out of the path of the radial projection 179 carried by the sliding clutch part 171. The free end of the trip arm 180 is bevelled as at 293 from a point extending inwardly thereof and said bevelled portion terminates in a notch 294 for receiving and holding the radially projected lug 179 on the clutch collar 171 so as to hold the clutch parts separated. It will thus be seen that when the cam disc 247 is in its starting position, the cam pin 261 will be disposed in spaced relation from the pivoted cam detent 270 and that the sliding bar 269 will be projected to dispose the clutch trip arm 180 into the path of the radially extending projection 179, and simultaneously the bell crank will have its hooked end 281 in position for being engaged by the annular flange 282 on the sliding clutch collar 84, so that rotation of the feed head 8 will impart rotation to the cam shaft through the medium of the gears 55, 165, 164, bevel gears 156, 154, worm 150 and worm wheel 149. Upon rotation of the cam shaft about one revolution the cam disc 209 will likewise be rotated so as to cause the lobe thereof 210 to engage the roller 214 and throw the clutch part 84 into driving engagement with the clutch part 82. Simultaneously, the oscillatable cutting tool supporting bar 88 will have been moved outwardly and the indexing head 118 rotated about a partial angular distance to position one of the stops in engagement with the end thereof. After the stock has been fed for a predetermined length thereof, the movement of the control link 254 will have rotated the cam disc 247 to a position to bring one of the cam pins such as 261 into engagement with the detent 270 which will simultaneously trip the clutch 84 and move the tripping arm 180 out of engagement with the radially projecting arm 179, thereby permitting another rotation of the cam shaft about an angular distance 360 degrees so as to again throw in the clutch part 84 and repeat the cycle of operation above described.

Means is provided for locking the clutch part 84 out of engagement with the clutch part 82 at the end of the cutting operation, or after a work piece of predetermined length has been formed and said means is operated by the control link 254 to lock the feed head out of operation even though the cam shaft is being rotated about its cycle of operations through its one revolution to perform the cutting off operation by moving the oscillatable cutting tool supporting bar 88 and repositioning the indexing head 118 to permit the oscillatable cutting tool supporting bar to travel inwardly to its fullest extent or limit as shown in Figure 2. In order to accomplish this, a cam plate 295 is secured to one end of the control link 254 by means of machine screws or the like as at 296 and said cam plate is provided with a cam projection 297 engaging the clutch lock-out latch lever when the control link 254 and work engaging arm 256 have moved outwardly a predetermined distance corresponding to the length of the work piece desired. Formed integral with the vertical standard 7 extending rearwardly therefrom is an arm 298 having an offset portion 299. A pivot pin 300 is passed through a suitable opening in the arm and a control lever 301 is rigidly secured to one end of said pivot pin as indicated in Figure 5. The opposite end of the pivot pin is provided with a clutch lockout latch lever 302 having a hooked end 304 for engaging over the annular flange 282 of the clutch part 84. The free end of the offset arm extension 299 terminates in a tubular guide portion 305 for slidably receiving a slide rod 306 having one of its ends bifurcated for receiving the free end of the lever 301 for being pivotally attached thereto by means of a pivot pin 307. A cam engaging roller 308 is mounted on the other end of the reciprocating bar 306 and said cam roller is mounted in a bifurcated portion of said slide rod 306 pivoted thereto by means of a pivot pin 309. A coil spring 310 has one of its ends hooked to an opening in the arm extension 299 and its opposite end hooked to an opening in the pivoted lever 301 so as to normally hold the hooked end 304 of the clutch lockout lever 302 out of engagement with the annular flange 282.

A coil spring 311 has its ends hooked over pins 312 and 313 mounted on the slide guide 253 and control link arm 256 as indicated in Figure 3, so as to normally urge said control link 254 toward the left. A similar coil spring 314 has one of its ends hooked in an opening 315 in the bell crank arm 218 with its opposite end hooked in an opening 316 in the rearwardly extending frame portion 183 so as to place the clutch controlling slide 211 under tension and normally hold the clutch roller 214 in engagement with the peripheral surface of the clutch controlling cam 209. In a similar fashion, the oscillatable cutting tool supporting arm 88 is normally urged inwardly by means of the coil spring 317 which has one of its ends hooked over a pin 318 carried by the vertical standard 6 and its other end affixed to a pin 319 extending laterally from the oscillatable cutting tool supporting arm 88.

*Operation of form of invention shown in Figures 1 to 23 inclusive*

For a consideration of the operation of the automatic machine tool, attention is directed to Figures 12 to 15 as well as 16 to 23 inclusive. In Figure 16, the stock S has been preformed and turned to the desired shape and the cutting tool has been moved to a cutoff position which is the position in which all of the parts of the automatic machine tool are shown in Figures 1 to 15 inclusive. In the cutoff position in Figure 16, the feed clutch is declutched including the parts 82 and 84 and the control link 254 has moved to the limit of its travel so as to lock said clutch parts out of engagement by the lockout lever 302. Simultaneously, the clutch lever 287 will have been raised by the cam member 263 engaging the detent 270 so as to move the tripping arm 180 out of the path of the radial projection 179 on the clutch collar 171. When the preformed work piece shown in Figure 16 is manually removed, the control link 254 will return so that the arm thereof 256 will assume a position shown in Figure 17. During the return of the control link, rotation of the cam disc 247 in a clockwise direction is effected to move the cam pin 261 thereon into position for engaging the detent 270 and permits the slide bar 269 to be projected simultaneously with the release of the clutch lockout lever 302. It is to be noted that during the cut-off operation, the clutch collar 171 is in a position to drive the cam shaft 147 and that the projection 179 will have moved an angular distance so as not to be engaged by the trip arm 180 upon projection of the sliding bolt 269 and that the latch 280 will be in a position to be engaged by the flange 282 of the clutch part 84 when said clutch is moved inwardly by the clutch control cam 209. It is to be noted that in the cutoff operation shown in Figure 16, the clutch collar 171 will have been placed in engagement with the clutch part 169 so as to drive the cam shaft 147, and that rotation of said cam shaft about a complete revolution will cause the cutting tool supporting arm 88 to be moved outwardly by the contol cam 192 simultaneously with the shifting of the indexing head 118 by means of its corresponding cam 197. After the oscillatable cutting tool supporting bar 88 has been returned to a new position and before the oscillatable cutting tool supporting arm 88 has finally come to rest at said position, the lobe 210 of the clutch cam 209 will have engaged the roller 211 so as to shift the linkage 218, 226, 238, to a position to force the clutch part 84 into driving engagement with the clutch part 82. Upon engagement of said clutch parts, the stock S is fed for a distance $a$ (Figure 16) wherein the cutting tool will reduce the stock to a reduced diameter for a portion of its length. During the feed and cutting of said stock along the length denoted by the reference character $a$, the control link arm 256 will have moved to a position shown in Figure 19 from the initial position in Figure 18 so that the first control cam pin 261 will engage the detent 270 and move the sliding bar 269 inwardly to a position similar to that shown in Figure 1. When the slide bar 269 is moved inwardly by the first cam pin 261, the clutch latch 280 is released from the annular flange 282 on the clutch part 84 to permit said clutch part 84 to separate from its component clutch part 82 and thereby cease the stock feed movement in a longitudinal direction. Also, engagement of the first cam pin 261 with the detent 270 will permit the latch trip lever 287 to move upwardly and release the notched end thereof 294 from engagement with the radial projection 179. Said projection 179 had previously been placed in engagement with the trip arm 180 to release the clutch parts 171 and 169 upon one complete revolution of the cam shaft. When the control trip lever 287 is again elevated, the clutch part or clutch collar 171 will be moved into driving engagement with the clutch part 269 by means of the coil spring 176 to again rotate the cam shaft 147 so as to move the cutting tool 96 in the direction of the arrows shown in Figure 19 to the position shown in Figure 20 by the cam members 192 and 197 rotating a complete revolution and moving the oscillatable cutting tool supporting arm 88 outward and backward for engaging the stop 137. The first rotation of the cam shaft positions the stop 136 in position and the second rotation of the cam shaft will cause the stop arm 137 to be moved into engagement with the adjustable screw 105 so as to hold the oscillatable cutting tool supporting arm at the limit of its outward movement and the cutting tool 96 out of the path of the stock S. After each revolution of the cam shaft, the radially extending stop 179 is engaged by the trip arm 180 to disengage the clutch parts 170 and 173, thereby causing rotation of the cam shaft to cease. As described in connection with the first operation, the cam lobe 210 of the clutch control cam 209 will at the end of its complete revolution have engaged the cam roller 211 and caused said linkage to be shifted so as to engage the clutch parts 82 and 84 and start the feed of the stock in a longitudinal direction. With the cutting tool 96 in its newly arranged position as shown in Figure 20, the stock S is fed longitudinally for a portion of its length as indicated in Figure 21. After the stock has been fed a predetermined distance, the second cam pin 262 will have been moved into engagement with the detent 270 by the movement of the control linkage 254 and control link arm 256. As this occurs, the slide bar 269 is moved to the right so as to elevate the latch lever 280 and release the clutch 84 from engagement with the clutch part 82 and simultaneously elevate the clutch tripping arm 180 out of the path of the radially projecting stop 179. With the clutch parts 82 and 84 disengaged, longitudinal feed of the stock will be momentarily arrested and the cam shaft 147 will be permitted to rotate about another complete revolution so as to move the oscillatable cutting tool supporting arm to the limit of its outward movement during which the cam 197 will have been rotated to shift the indexing head 118 in the direction of the arrow (Figure 2) so as to bring the stop pin 138 into a position of registry with the stop screw 105 upon the return of the oscillatable cutting tool supporting arm 88. At the end of the complete revolution made by the cam shaft 147, the lobe of the clutch cam 210 will have again caused the clutch collar 84 to be moved into engagement with the clutch part 82 so that feeding movement of the stock will rotate the cam disc 247 and permit the slide bar 269 to be again projected with the stop arm 180 positioned in the path of the projection 179 for arresting rotation of said cam shaft. As the cutting tool 96 is moved inwardly, the end thereof as at 99 engages the stock as shown in Figure 22 so as to cut a starting groove therein before longitudinal feeding movement of the stock is again initiated by means of the cam lobe 210 effecting engagement of the clutch parts 82 and 84. After the starting groove has been cut and the stock has been fed for another portion of its length as shown in Figure 23, with the cutting tool 98 in position for turning another portion thereof $b$, and for reducing the stock in diameter, the feed control link 254 will have moved to a new position with the cam projection 297 in engagement with the roller 308 on the lockout lever 301 so that the last cam projection 263 on the cam disc 247 will be moved into the path of the detent 270, thereby tripping the clutch part 84 by elevating the latch lever 280 and simultaneously elevating the stop arm 180 from engagement with the projection 179. With the clutch parts 82 and 84 thus locked out of engagement, the cam shaft 147 will make its usual revolution to cause the cutter controlling cam 197 to be moved outwardly and simultaneously move the indexing head 118 to the position shown in Figure 2 so as to allow the oscillatable cutting tool supporting arm to move to the limit of its inward travel in the direction as indicated by the arrow in Figure 23, and thereby cut off the stock or preformed work piece as shown in Figure 16. After the cam shaft has been rotated about a portion of its complete revolution, the lobe 210 of the cam 209 will again engage the roller on the end of the slide rod 211 but the clutch part 84 will be retained out of engagement with the clutch part 82 by the lockout lever 302 and relative movement between the clutch control link parts 223 and 226 will be permitted by the slide connections 227 and 230 without clutching said clutch parts 82 and 84.

As shown in Figure 16, the cutting tool 96 has moved to the limit of its inward travel so as to sever the preformed workpiece from the remaining portion of the stock. As the work piece is severed, it falls by gravity so that the end thereof will be out of the path of the work engaging foot 258 on the control link 256 to allow said control link 254 to return to its original position, as shown in Figure 17. When the control link 254 has been moved to the left by means of the coil spring 311, the cam disc 247 is rotated in a clockwise direction so as to again position the cam pins 261, 262, and 263 for successive engagement with the detent 270 with the cam disc 247 in the above position, the cam plate projection 297 is out of engagement with the roller 308 to permit the release of the lockout lever 302 and allow the clutch parts 82 and 84 to again be moved into clutching engagement. The automatic machine tool is ready to start another cycle of operations as shown in Figures 17 to 23 inclusive, to turn, cut and preform another work piece P in identically the same manner and of the same dimensions. It is to be understood that the lobe 210 of the clutch controlling cam 209 is so positioned as to maintain driving relationship between the clutch parts 82 and 84 a sufficient interval of time to permit the feeding of the stock a relatively short distance so that the cam pin on the cam disc 247 which happens to be in engagement with the detent 270 at the moment will move out of the path of said detent and allow the clutch locking lever 280 to engage over the flange 282 and simultaneously lower the lever extension 287 when the lobe of the clutch cam has reached the position shown in Figure 2 and thereby present the tripping arm 180 in the path of the radial projection 179. As above described, the end of the tripping arm 180 is so fashioned as to move the clutch part 171 to the left to disengage the clutch faces 169 and 173 when the end of said projection engages the bevel face 293 of the tripping arm 180. In addition, the tripping lever 180 receives the radial projection 179 in the notch 294 thereof so as to hold the radial projection and clutch member 171 free of the driven collar 169.

As mentioned above, the oscillatable cutting tool supporting arm 88 is always maintained at the limit of its outward travel for a portion of the cam shaft rotation equal to the angular distance $m$ in order that the cam surface between the angular distance $q$ of the indexing head 197 may be given a chance to shift the indexing head 118 to properly position the same to bring one of the stops 136 and 138 into position before the oscillatable cutting tool supporting arm 88 is returned. For this reason, the dwell 191 of the cam 185 between the angular distances $x$ and $y$ is intended to hold the oscillatable cutting tool supporting arm at the limit of its outward travel until the repositioning of the indexing head 118. After each completion of crankshaft rotation about a single revolution, the lobe 210 of the cam 209 will be positioned as shown in Figure 2, and the cams 192 and 197 will likewise come to rest at a corresponding position (Figure 2).

The positions of the cam discs 185, 197 and 209 on the cam shaft 147 are such as to enable the various movements of the oscillatable cutting tool supporting arm 88 and indexing head to take place in succession. For instance, during rotation of the cam shaft 147 from its initial position about an arc $l$ from the radial lines $z-x$, the oscillatable cutting tool supporting arm is moved outwardly and simultaneously the cam disc 197 has been moved about an arc of 30 degrees to bring the radial line $o$ to a position in registry with the radial line $j$. Upon another 30 degree rotation of the cam shaft 147, the dwell 191 of the cam disc 185 will engage the roller 111 through an arc of rotation $m$ to hold the oscillatable cutting tool supporting arm at the limit of its outward travel and thereby permit the cam surface of the cam disc 197 to engage the roller 200 between the radial lines $o$ and $p$ about an arc $q$ so as to cause the indexing head 118 to be shifted to a new position. Upon continued rotation of the cam shaft 147, the cam disc 185 will travel through an arc $m$ from the radial line $y$ to the radial line $z$ so as to permit said oscillatable cutting tool supporting arm to move inwardly with the adjusting screw 105 resting upon a newly positioned stop pin 136 to 138 inclusive. During the continued rotation of the cam shaft 147 about the arc $n$, the cam disc 197 will have rotated a corresponding angular distance to permit the control link 206 to be moved upwardly so that the latch arm 126 will be repositioned for engaging over another stop pin 133. At a period slightly before the cam shaft 147 reaches the end of the angular distance $m$ the lobe 210 of the cam disc 209 will cause the clutch parts 82 and 84 to be engaged to again start the operation of the feed head so as to feed said stock longitudinally with the cutting tool 96 moved to its new radial position. It is to be understood that the radial projecting stop 179 engages the tripping arm 180 after each revolution of cam shaft rotation so as to arrest movement of the cam shaft until one or the other of the cam pins 261 to 263 is brought into registry with the detent 270.

*Modified automatic machine tool construction shown in Figures 24 and 25*

The machine tool in Figures 24 and 25 is identical with the form described in connection with Figures 1 to 23 inclusive and embodies a base 5, vertical standards 6 and 7 between which is supported the feed head 8 described in connection with Figures 6 to 11 inclusive, so as to feed the stock through the chuck 40 in substantially the same fashion. In addition, there is provided another oscillatable cutting tool supporting arm 320 having an offset lower portion 321 for being pivotally attached to the vertical standard 6 by means of a pivot pin 322. A cutting tool supporting guide 323 is affixed to the oscillatable cutting tool supporting arm 320 by means of screws or the like as at 324 and said guide plate is provided with a channel slot 325 for receiving the shank 326 of a cutting tool. The free end of the cutting tool as at 327 projects in opposed relation to the end of the cutting tool 96, and may be shaped to cut the stock along a radial wall so as to remove a portion of the metal of said stock slightly in advance of the cutting tool 96. The upper end of the oscillatable cutting tool supporting arm 320 is provided with a stop screw 330 similar to the stop screw 105 and said stop screw is provided with a lock nut 331 for holding the same in a predetermined locked position.

Slidably mounted on the intermediate portion of the oscillatable cutting tool supporting arm 320 is a U-shaped frame 332 similar to the frame 109 and said U-shaped frame is provided with an adjusting screw 333 which is threaded in an opening 334 in the oscillatable cutting tool supporting arm 320 (Figure 25). Locking nuts 335 are mounted on the screw 333 to hold the same in adjusted position. Rotatably mounted between the spaced ends of the U-shaped frame 332 is a cam engaging roller 336 mounted on a suitable pin 337. The cam engaging roller 336 is adapted to engage a cardioid shaped cam 338 in the same fashion as the roller 111 engages the cardioid-shaped cam 185 and said cam 238 is affixed to the cam shaft 147 in substantially the same manner as described in connection with the form of the invention shown in Figures 1 to 3 inclusive. As shown in Figure 25, a cardioid shaped cam 338 is keyed to the cam shaft 147 by means of the key 187 and the nut 193 is threaded in place on the end of the cam shaft to retain the cams 185 and 338 in position. The cams 185 and 338 are fashioned to provide oppositely arranged dwells between the angular distance lines $x$ and $y$ so as to hold the oscillatable cutting tool supporting arms 88 and 320 at the limit of their outward travel during repositioning of the index head. The indexing head 118 is substantially identical with the indexing head 118 shown in Figures 1 to 23 inclusive with the exception that another indexing disc 340 is affixed to the indexing head 118 to rotate therewith so as to provide stop members for the oscillatable cutting tool supporting arms 88 and 320. The end of the shaft 120 has its head 121 engaging the outer indexing head 118 and the inner indexing head 340 is secured to rotate with the head 118 simultaneously. The stops 136, 137 and 138 on the indexing head 118 are arranged for engagement with the stop screw 105 and the stops 341, 342 and 343 on the indexing head 340 are arranged so as to be positioned in the path of the adjustable stop 330. The various projections 136, 137 and 138 are offset a slight angular distance from the stop members 341, 342 and 343 so that as said indexing heads 118 and 340 are rotated in unison in the direction of the arrow, the stop 136 on the indexing head 118 will be brought into registry with the adjustable stop screw 105 simultaneously with the movement of the stop member 341 into the path of the adjustable screw 330. In this manner, the oscillatable cutting tool supporting arms 88 and 320 will be held in corresponding positions on opposite sides of the stock so that the respective cutting tools 96 and 326 will cooperate to perform the various turning and cutting movements in response to the rotation of the indexing heads 118 and 340 in unison. The link 206 has one of its ends connected to a lever 202 on the arm extension 205 so that the roller 200 thereof will be engaged by the lemniscate cam 197 which is common to both forms of the invention in Figures 1 to 23 inclusive, and 24 and 25. The other end of the control link 206 is fastened to the indexing head rotating arm 125 which carries the detent lever 126 so that the hooked end thereof as at 127 will engage over suitably disposed pins 133 in the rear face of the indexing head 340. As in the case of the pins 133, in Figures 1 to 23, the pins 133 in the form of the invention shown in Figures 24 and 25 may be shifted and inserted in other circumferentially spaced openings 134. A coil spring 344 has one end affixed to a pin 345 extending laterally from the oscillatable cutting tool supporting arm 320 and its other end hooked over the pin 318 provided for the other cutting tool supporting arm spring 317. The operation of the form of the invention shown in Figures 24 and 25 is identical to that shown and described in connection with Figures 1 to 23 inclusive with the exception that the additional oscillatable cutting tool supporting arm 320 is provided, and another control cam, indexing head and cutting tool are provided in addition to the ones above described. The various cams are so shaped and the indexing head 340 so positioned as to perform the same movements and series of operations described in the diagrammatic illustrations in Figures 16 to 23 inclusive.

Modified form of invention shown in Figures 26 to 37 inclusive

The automatic machine tool in the form shown in Figures 26 to 37 inclusive comprises a base 350 having vertical standards 351 and 352 spaced apart similarly to the vertical standards 6 and 7 in the previously described forms of the invention, for rotatably supporting the feed drum or head 8. Structurally, the feed drum or head 8 is identical with the rotary feed head shown in Figures 6 to 11 inclusive and is adapted to feed the stock S' through the chuck or collet 40 which likewise is constructed in accordance with the forms of the invention shown in Figures 1 to 25 inclusive. The feed drum includes the semi-round sections 13 and 14 cut away as at 19 and 20 for accommodating the feed discs 21 and 22 on the shafts 32 and 33 respectively and as in the case of the feed drum described and illustrated in Figures 6 to 11 inclusive, the discs 21 and 22 are driven by the worm wheel 79 on the rotary shaft 75. The pinions 74 of said shafts are in mesh with the idle pinion 72 which is rotatably mounted on the tubular shaft 10 and the gear 55 is keyed to said short tubular shaft by a key 56. The vertical standard 352 is provided with a rearwardly extending arm extension 353 having a bearing portion for supporting a shaft 354. A tubular sleeve similar to the sleeve 60 in Figure 6 is rotatably mounted on the shaft 354 and said sleeve is enlarged as at 355 to provide a clutch part having clutch teeth 356. Secured to the shaft 354 as by means of a screw or the like is a clutch collar 357 having clutch teeth 358 adapted to drivingly engage the clutch teeth 356 and the structure involving the shaft 354, clutch parts 355 and 357 are identical in construction with the clutch mechanism shown in Figure 6. Keyed to one end of the shaft 354 is a gear wheel 358 and in a similar fashion, a gear wheel of slightly smaller diameter as at 359 is secured to the rotary sleeve of the clutch part 355. The gears 358 and 359 correspond to the gears 69 and 61 of the clutch structure (Figure 6) and are in driving engagement with the gears 55 and 72 by means of a pair of idle gears 360 and 361 rotatably mounted on a relatively short shaft 362 secured to the rearwardly extending arm 353. The gears 360 and 361 are held in spaced relation and against displacement from the shaft 362 by means of a nut or the like 363. It will thus be seen that rotation of the feed drum 8 by means of a drive belt connected to a motor and trained over the pulley groove 57 will rotate the gears 55, 361 and 359, and if the clutch parts 355 and 357 are positioned so that their clutch teeth 356 and 358 are in engagement, rotary motion will be imparted to the feed discs 21 and 22 through the medium of the gears 358, 360, 72 and 74. As is the case in connection with the feed head structure shown in Figures 6 to 11 inclusive, a coil spring is provided on the shaft 354 between the clutch parts 355 and 357 to normally hold said clutch parts disengaged.

Formed integral with the vertical standard 351 is a tubular boss 364 having a threaded opening for receiving a pivot stud 365. Pivotally mounted on the pivot stud 365 is an oscillatable cutting tool supporting arm 366 having its lower end offset as at 367 in substantially the same manner as described in connection with the oscillatable cutting tool supporting arm 88 in the form of the invention shown in Figures 1 to 23 inclusive. A cutting tool supporting plate 368 is secured to the oscillatable cutting tool supporting arm 366 by means of a series of screws or the like 369 and said cutting plate is provided with a longitudinal groove 370 on the rear face thereof for slidably receiving the shank of a cutting tool 371. A tool engaging stop 372 is formed integral with the clamping plate 368 for engaging the bevelled edge of the cutting tool so as to limit the movement of the tool when being adjusted. A set screw 373 is threaded in the clamping plate 368 and has its inner end in engagement with the shank of the cutting tool 371 so as to hold said tool in an adjusted position.

The upper end of the oscillatable cutting tool supporting arm 366 is provided with a U-shaped frame 374 having an adjusting screw 375 with its inner end received in a threaded opening 376 in the oscillatable cutting tool supporting arm 366. The spaced arms of the U-shaped frame as at 377 are provided with a cam roller 378 adapted to be engaged by a rotary cam for controlling the movement of the cutting tool 371 during the various stages of the machine operation. A coil spring 379 has one of its ends hooked over a pin 380 on the oscillatable cutting tool supporting arm 366 and its other end hooked over a pin 381 on the vertical standard 351, to thereby urge said oscillatable cutting tool supporting arm inwardly in the direction of the stock being fed by the rotary feed head 8.

The upper end of the vertical standard 351 is offset as at 382 and terminates in a tubular bearing portion 383 for rotatably receiving a cam shaft 384. One end of the cam shaft is longitudinally slotted as at 385 and is reduced and screw-threaded as at 386 for permitting the various cam mechanisms to be secured thereto. The opposite end of the cam shaft 384 is provided with a collar 387 secured in place by means of a transverse pin 388. The hub 389 of a worm wheel 390 is mounted on the cam shaft 384 to rotate freely thereon and said gear wheel is adapted to be rotated by means of an intermeshing worm 391 secured to a driven shaft 392 suitably journaled in a bearing boss 393 integrated with the vertical standard by means of a connecting web portion 394. One end of the rotary shaft 392 is provided with a bevel gear 395 which is rigidly secured thereto and adapted to mesh with a bevel gear 396 slightly smaller in diameter which has its hub 397 mounted on a rotary shaft 398 at right angles to the rotary shaft 392. The ends of the rotary shaft 398 are journaled in the frame structure between the vertical standards 351 and 352 and one end is rotatably supported in a tubular bearing boss 399 formed integral with a forwardly extending arm 400 on the vertical standard 351 while the other end is supported in a tubular bearing portion 401 and forwardly and upwardly inclined arm extension 402 formed integral with the vertical standard 352. A relatively large gear wheel 403 is mounted on the rotary shaft 398 and affixed thereto and said gear wheel 403 is in driving engagement with a gear wheel 404 rotatably mounted on a shaft 405 affixed to the upwardly and forwardly inclined arm extension 402. The gear wheel 404 is drivingly engaged by the gear wheel 55 rigidly secured to rotate with the feed drum 8 so that rotation of said feed drum will impart rotation to the worm wheel 390 on the cam shaft 384 through the various gears 55, 404, 403, 396, 395, and worm 391.

In order to connect the worm wheel 390 to the cam shaft 384, the hub of the worm wheel 390 as at 389 is formed with a series of clutch teeth 405 which are adapted to be engaged by similarly formed clutch teeth 406 on a clutch collar 407 keyed to the cam shaft 384 by means of a suitable key 408. The clutch collar 407 may slide longitudinally on the cam shaft 384 and a coil spring 409 encircles the cam shaft and has one end engaging the stationary collar 387 and its opposite end in engagement with the clutch collar 407, to urge the clutch teeth 406 thereof into engagement with the clutch teeth 405. Held in place on the other end of the cam shaft 384 by means of a suitable key 409 in a series of cam discs 410, 411 and 412 which have their hubs 413, 414 and 415 provided with longitudinal keyways for receiving the key 409 so as to hold the cam disc locked to said cam shaft to rotate therewith. A nut 416 is threaded on the reduced screw-threaded end 386 of the cam shaft so as to engage the hub 415 of the cam disc 412 and likewise hold the hubs 414 and 415 in side by side relationship and against one end of the tubular bearing boss 383. The cam disc 412 is shaped as shown in Figure 31 to provide a series of cam faces during various angular portions of rotation as denoted by the reference characters r, s, t, u, v and w. The angular rotational distance r provides a sloping cam surface 417 for permitting the roller 378 carried by the oscillatable cutting tool supporting arm 366 to move inwardly toward the cam shaft 384 to the extent of its inward movement, while the angular distance s of the cam disc 412 is shaped to provide a peripheral gradually increasing cam portion 418 to move the oscillatable cutting tool supporting arm outwardly away from the stock. The angular distance t of the cam disc 412 provides a dwell portion 419 to hold the oscillatable cutting tool supporting arm 366 in a predetermined position. Further, the cam disc 412 has its peripheral portion shaped between the angular distance marking u to provide a sharply increased cam surface 420 terminating in a dwell 421 between the angular distance markings v. The remaining portion of the cam disc 412 between the angular distance markings w is shaped to provide a decreasing cam surface 422. The various cam surfaces between the angular markings r, s, t, u, v and w will be later described in detail in connection with the operation of the automatic machine tool to show the manner in which the oscillatable cutting tool supporting arm 366 is moved to produce the desired work piece contour. As shown in Figure 26, a cam disc 412 is in a position in which the cutting tool 371 is at the limit of its inward movement.

Extending rearwardly from the tubular boss 383 is an offset arm portion 423 having a longitudinal extension 424 projecting longitudinally with the cam shaft 384. The free end of the extension 424 terminates in an inclined portion 425 having a tubular boss 426 formed on the end thereof. The tubular portion 426 is adapted to provide a bearing for a rotary shaft 427 one end of which projects a slight distance for receiving the hub 428 of a gear wheel 429. The hub 428 is secured in place by means of a transverse locking pin or the like as at 430. Mounted on the opposite end of the rotary shaft 427 on the other side of the tubular boss 426 is the hub 431 of a clutch control cam disc 432 and it is to be noted that the shaft 427 is extended slightly for receiving the hub 433 of another cam disc 434 which is adapted to rotate with the cam disc 432 and is formed slightly larger in diameter as indicated in Figure 26. The clutch control cam disc 432 is provided with an arcuately curved slot 435 for receiving an adjustable cam pin 436 and the cam disc 434 is provided with a similar arcuately curved slot 437 for receiving adjustable cam pins 438 and 439. Rotation is imparted to the rotary shaft 427 by means of the control link 440 which is slidably mounted in a tubular guide 441 integrated with the vertical standard 351 with the rear end arranged to pass through a slotted opening 442 in the upper end of the vertical standard 352. One end of the control link 440 as at 443 is provided with a series of rack teeth 444 for drivingly engaging the gear wheel 429 so that longitudinal movement of the control link 440 will rotate said shaft and likewise the cam discs 432 and 434. Mounted on the opposite end of the control link 440 is a work-engaging arm 445 having a tubular portion 446 for receiving said control link 440 so that a locking pin or the like 447 may be passed therethrough to securely anchor said arm 445 in position. The work-engaging arm 445 is offset slightly and terminates at its lower end in a work-engaging head 448 adapted to be engaged by the end of the stock during the feeding motion thereof caused by the rotary feed head 8.

Digressing momentarily to the cam shaft 384, it will be noted that the cam disc 410 is provided with a lobe 449 which is adapted to engage a cam roller 450 mounted on one end of a slide rod 451. The slide rod 451 is guided in a guideway 452 formed in an extended portion 453 of the rearwardly extending arm 423. Extending rearwardly from the longitudinal frame extension 424 is a rearwardly projecting arm 454 to which is pivoted a pair of bell crank levers 455, and 456, as at 457. The bell crank levers 455 and 456 are rigidly secured to the end of the pivot pin 457 to operate in unison and the bell crank lever 456 is connected to the slide bar 451 by interconnecting links 458 by means of suitable pivot pins 459 and 460 respectively. The other bell crank lever 455 is connected to an attenuated link 461 which extends longitudinally of the frame structure and is connected to a bell crank lever 462 by means of a pivot pin 463. The bell crank lever 462 is rigidly secured to the upper end of the vertical shaft 464 which extends through a suitable bearing opening in the rearwardly extending portion 465 integrated with the longitudinally extending frame portion 424. The lower end of the shaft 464 is likewise received in a goose-necked bearing bracket 466 integrated with the offset portion 353 of the vertical standard 352. Secured to the lower end of the shaft 464 is a collar 467 having a radially extending arm 468 which terminates in a pair of yoke arms 469. The yoke arms 469 are provided with pins 470 which are received in an annular groove 471 in the clutch part 357.

Extending downwardly from the rearwardly projecting frame portion 424 is a depending arm 472 terminating in a tubular guide portion 473 for receiving a slide bar 474 which is spring-projected in the direction of the rotary shaft 427 in substantially the same manner as pointed out in connection with the slide bar 269 in the form of the invention shown in Figures 1 to 23 inclusive. Pivotally attached to one end of the slide bar 474 is a detent 475 which is adapted to be projected into the path of a cam pin 436 and said detent 475 is held in place by a relatively short pivot pin 476. A coil spring 477 has one of its ends hooked to the slide bar 474 and its opposite end affixed to a rearwardly extending projection 478 on said detent to hold said rearwardly extending projection against a stop pin 479 anchored in the slide bar 474. The opposite end of the slide bar is provided with a laterally projecting pin 480 which is received in the bifurcated end 481 of a bell crank lever pivoted by means of a short pivot pin 482 to an extension 483 depending from the tubular guide portion 473. The other lever 484 of the bell crank lever has its free end hooked as at 485 for engaging over an annular flange 486 formed on the clutch part 357, so as to hold said clutch part with its clutch teeth 358 in engagement with the clutch teeth 356 on the clutch part 355 and thereby establish longitudinal feeding movement of the stock S' through the rotary feed drum 8. It will thus be seen that when the cam lobe 449 on the cam disc 410 engages the roller 450, the clutch control linkage 458 to 464 will be operated to move the clutch yoke arm 469 in a direction to engage the clutch parts 355 and 356 against the action of the intermediate coil spring positioned therebetween and that after said clutch parts have been engaged the hooked end 485 of the latch lever 484 will engage the flange 486 of the clutch part 357 and hold the clutch parts in engagement until the bell crank lever 484 is tripped by engagement of the cam pin 436 with the detent 475. A coil spring 488 has one of its ends affixed to a pin 489 on the bell crank lever 456 and its opposite end affixed to a pin 490 secured to the rearwardly projecting arm extension 454 so as to hold the sliding cam bar 451 in a position with the roller 450 thereof in engagement with the peripheral surface of the cam disc 410.

In a somewhat similar fashion, the cam disc 411, secured to the cam shaft 384 is adapted to control the movable clutch collar 407 and said cam disc 411 is provided with an arcuate slot 491 for receiving adjustable cam blocks 492 and 493 adapted to be held in position by nuts 494 and 495 threaded on the free threaded end of round extensions formed on said cam blocks 492 and 493. Slidably mounted in a tubular guide 496 integrated with the rearwardly extending frame portion 424 is a slide bar 497 having affixed to one end an offset foot portion 498 which is bifurcated for receiving a cam roller 499. The cam roller 499 is adapted to engage the cam disc 411 and to be intermittently engaged by the cam blocks 492 and 493, during rotation of the cam shaft. The opposite end of the slide rod 497 is provided with an arm extension 500 having a collar portion 501 secured to the shaft 497 by means of a locking pin or key 502. The arm extension 500 is formed with a pair of spaced yoke arms 503 which are adapted to engage within an annular groove 504 in the clutch collar 407 so as to move said clutch collar 407 against the tension of the coil spring 409 and disengage the clutch pieces 405 and 406 when either one of the cam blocks 492 and 493 engages the cam roller 499. The clutch collar 407 may be locked in a position to hold the clutch keys 405 and 406 out of engagement and comprises a lock-out lever 505 having its hub portion 506 secured to one end of a pivot shaft 507 pivotally mounted in a suitable bearing boss 508 integrated with the inclined portion 425 on the longitudinally extending frame portion 424. The opposite end of the pivot shaft 507 is provided with a crank arm 509 having its hub portion 510 secured in place by a pin or the like 511 and the free end of said crank arm 509 is provided with a roller supporting pin 512 upon which is rotatably mounted a cam pin engaging roller 513. The free end of the lock-out lever 505 is provided with a hooked end 514 for engaging over an annular flange 515 on the clutch collar 407 so as to engage said annular flange and hold the clutch collar 407 away from the worm wheel collar 389. An arm extension 516 is secured to the tubular bearing boss 508 to which is attached a coil spring 517 which has its opposite end affixed to a laterally extending pin 518 on the lockout lever 505. The coil spring 517 is adapted to resiliently urge the hooked end 514 of the lockout lever 505 toward the clutch collar 407 to present the hooked end 514 of the lockout lever 505 in the path of the annular flange 515 so as to hold the clutch collar 407 away from the worm wheel hub 389. Although the clutch collar 407 is keyed to the cam shaft 384 by means of the key 408, said clutch collar is provided with a longitudinal slot 519 for receiving a radially extending pin 520 projecting from and secured to the cam shaft 384.

The control link 440 is yieldingly urged in a direction to rotate the gear 429 and cam discs 432 and 434 in a clockwise direction and as illustrated in Figure 28, a pin 521 is affixed to the collar 446 of the arm extension 445 for receiving the hooked end of the coil spring 522. The other end of the coil spring is affixed to a pin 523 secured to the tubular guide 441 so as to retract the control link 440 and cause the same to be moved to the left after the removal of the completed work piece, so that the work engaging head 448 of the arm extension 445 will assume a position as shown in Figure 33 after each cut-off operation.

*Operation of the form of the invention shown in Figures 26 to 37*

For a consideration of the operation of the automatic machine tool shown and described in the above-mentioned figures, it will be noted that the operation while being somewhat similar to the operation of the machine tools shown in Figures 1 to 25 inclusive depends entirely upon the shape of the cam 412 for moving the cutting tool to the various radial distances so as to produce the desired contour on the work piece P, and instead of the stop members 136, 137 and 138 in the form of the invention in Figures 1 to 25 limiting the inward movement of the oscillatable cutting tool supporting arm 366, the cam 412 is so shaped as to move the cutting tool supporting arm the required amount to produce the desired work piece contour.

It will first be assumed that the rotary feed head 8 is drivingly connected to a source of power such as an electric motor or the like with the driving relation established by means of the V-belt trained over the pulley on the armature shaft of the motor and likewise trained over the pulley groove 57 of the rotatable feed head 8. Rotation of the feed head will, as above pointed out, rotate the cam shaft 384 to rotate the cams 410, 411 and 412 in unison when the clutch collar 407 is positioned so that the clutch teeth 406 are drivingly engaged by the clutch teeth 405 formed on the hub 389 of the worm wheel 390. With the various parts of the machine tool arranged as shown in the several views in which they are related at the moment when the work piece P is being severed or cut off from the remaining portion of the stock S', the clutch parts 355 and 357 are disengaged by reason of the projection of the control link 440 causing the cam pin 436 to engage the detent 475 and trip the clutch latch lever 484. In Figure 32, the cutting tool 371 is shown as being advanced to the limit of its inward travel for cutting off the finished work piece P of the remaining portion of the stock. Again, let it be assumed that the work piece P has been completed and removal thereof from between the cutter 371 and work-engaging head 446 has permitted the control link 440 to be retracted which imparts clockwise rotation to the cam discs 432 and 434. With the control link arm 445 in the position shown in Figure 33, the cam pins 438 and 439 will be positioned in advance of the roller 513 and the pin 436 in advance of the detent 475 a considerable distance so that counterclockwise rotation of the cam discs 432 and 434 will cause said cam pins to engage their respective roller 513 and detent 475 when the control link 440 is projected again. When the control link 440 and cam discs 432 and 434 are arranged as above described, the collar 357 will be out of engagement with the clutch part 355 and the clutch collar 407 will be in driving engagement with the clutch teeth 405 on the hub 389 of the worm wheel 390.

Immediately after the work piece P has been cut off or severed, as shown in Figure 32, the cam shaft 384 is rotated and longitudinal feeding movement of the stock S' is started by the lobe 449 on the cam 410 engaging the roller 450 and causing the clutch collar 357 to be moved into engagement with the clutch part 355 through the medium of the various bell crank levers and links 455, 456, 458, 461 and 462. The moment the stock feed is initiated the slight inclined surface 417 of the cam 412 will urge the roller 378 of the oscillatable cutting tool supporting arm 366 in an outward direction a slight amount so as to move the cutter 371 as shown in Figure 33, from its centralmost position to a radial position to form a round nose on the work piece P while the stock has fed a short distance c as indicated in Figure 32.

After the initial motion of the cam 412, about an angular distance r of cam and cam shaft rotation 412 and 384 respectively, in the direction of the arrow indicated in Figure 31, continued rotation of the cam 412 and cam shaft 384 about an angular distance s will cause the cutting tool 371 to be guided outwardly along the distance d indicated in Figure 32 so as to form a tapered surface on the front end of the work piece. Upon completion of the partial rotation of the cam shaft 412 about the angular distance s, the cam surface of the cam 412 will be in position to engage the roller 378 and hold the cutting tool 371 in a fixed radial position during the cutting and turning of another portion of the work piece denoted by the reference character e. Before the cam 412 has completed its movement through the angular distance t, the cam block 492 will engage the roller 499 on the slide rod 497 and cause longitudinal movement thereof so as to shift the clutch yoke 500 to the left and thereby disengage the clutch teeth 405 and 406 on the worm wheel hub 389 and clutch collar 407 respectively. As the clutch collar 407 is moved to the left against the action of the coil spring 409, the hooked end 514 of the lockout lever 505 will engage over the annular flange 515 on the clutch collar 407 and thereby lock said collar in its declutched position with the cam surface 419 in engagement with the roller 378 to hold the cutting tool at its fixed radial position as shown in Figure 34. Continued feeding movement longitudinally of the stock S' will cause the straight portion of the work piece to be turned as shown in Figure 35 and after said straight portion has been turned, the control link 440 and control link arm 445 have been moved to the right a considerable distance to rotate the cam disc 434 in a counterclockwise direction so as to bring the cam pin 438 into engagement with the roller 513 and trip the lockout latch lever 505 in such a manner as to release the hooked end thereof as at 514 with engagement with the annular flange 515 and permit the clutch collar 407 to be again moved to the right under the action of the coil spring 409. Engagement of the clutch teeth 405 and 406 will again rotate the cam shaft 384 for the remaining portion of the angular distance t (Figure 31) and bring the cam surface 420 of the cam 412 into engagement with the roller 378 on the oscillatable cutting tool supporting arm 366 so that movement of said cam 412 about the angular distance u will cause the cutting tool 371 to be moved outwardly from the position shown in Figure 35 to the position shown in Figure 36 to form the inclined surface f on the work piece P (Figure 32). With the cutting tool 371 moved to its new radially fixed position as shown in Figure 36, continued longitudinal feeding movement of the stock S' and rotation of the cam 412 will cause the cam surface 421 to be brought into engagement with the roller 378 so as to hold said roller 378 and cutting tool 371 in the radial fixed position shown in Figure 36 out of engagement with the stock for a portion of the angular movement v of the cam surface 421. At the moment when the cam surface 421 is brought into engagement with the roller 378, the second cam block 493 on the cam disc 411 will engage the roller 499 on the clutch control rod 497 so as to again shift the clutch yoke 500 to the left and disengage the clutch teeth 405 and 406. Upon disengagement of the clutch parts 407 and 389, rotation of the cam shaft 384 will be arrested with the cutting tool 371 held in its radially fixed position during the longitudinal feeding movement of the stock as shown in Figure 37 so as to produce the remaining portion g of the work piece P. When the stock S' has been fed a distance equal to the linear distance g (Figure 32), the second cam pin 439 on the cam disc 434 will be brought into engagement with the roller 513 on the lockout lever arm 509 so as to again trip the arm 505 and permit the clutch teeth 405 and 406 to be engaged. Simultaneously, the control link 440 and the control link arm 445 will have advanced to the right a considerable distance so as to bring the cam pin 436 into engagement with the detent 475 so as to trip the clutch collar 357 and allow the clutch teeth 356 and 358 to separate due to pin 449 or cam 412 contacting roller 450. Separation of the clutch teeth on the clutch parts 355 and 357 will arrest the longitudinal feeding movement of the stock S' so that as the cam 412 completes a partial rotation of the angular distance v, the cam 412 will have moved to a position such that the cam surface 422 will be in engagement with the roller 378. Continued rotation of the cam 412 about the angular distance w will cause the cutting tool 371 to be moved inwardly from the position shown in Figure 37 to the cut off position shown in Figure 32. The completed work piece P will fall from its position between the control link head 446 and cutting tool 371 by its own weight or gravity and thereby permit the control link 440 to move to the left to reposition the cam discs 432 and 434, whereupon the cycle of operation may be continued immediately after the removal of the work piece with the cutting tool 371 in its innermost position with the point thereof on the center line of the stock S'.

A work piece as shown in Figure 38 can easily be formed in the automatic machine tool as described in Figures 26 to 37 inclusive in substantially the same manner as described in connection with the work piece P with the exception that the cam 412 will have its surface 422 altered and preshaped so as to cause the cutting tool 371 to move inwardly to form the surface h instead of the round portion along the linear distance g as shown in Figure 32. The surfaces d', e', and f' are formed in identically the same manner as described in connection with the work piece P. Means will necessarily have to be provided during the angular movement w of the cam 412 for causing the cutting tool 371 to move outwardly to produce the shoulder i before the work piece P' reaches its cutoff position corresponding to the position shown in Figure 32. This can be accomplished by providing the cam surface 422 with a slight projection to move the tool 371 outwardly and by arranging and positioning another cam pin on the disc 432 as well as another cam projection 449 on the cam disc 410 so as to disengage the clutch teeth 356 and 358 and thereby arrest the longitudinal feeding movement of the stock during the movement of the cutting tool in a radial direction to form the shoulder i. After the second projection on the cam disc 410 has engaged the cam roller 450, the clutch collar 357 will be again moved to the right so as to engage the clutch teeth 356 and 358 and cause longitudinal feeding movement of the stock with the cutting tool held in its radially fixed position out of the path of the stock and until the cam pin 436 has again provided for disengagement the clutch parts 355 and 357 so as to permit the continued movement of the cam disc 412 about the remaining portion of the angular distance w to permit the cutting tool 371 to be moved inwardly to its limit or centralmost position with respect to the stock corresponding to the cutoff position shown in Figure 2.

It is to be noted that elongated stock of various cross-sectional shapes and sizes may be fed in the feed head 8 as indicated at S" in Figure 10a without materially altering the structure of the feed discs due to the fact that said feed discs are constructed and arranged to engage the stock about four peripheral points with each pair of feed discs arranged in opposed diametrical relation. In Figure 10a, the stock S" is shown as being hexagonal in cross section and it is readily seen that opposed pairs of feed discs engage the flat angular walls of said stock to provide a tight friction grip therewith.

Obviously, the cam disc 412 may be shaped with a plurality of variously arranged cam surfaces to produce the work pieces of any desired contour and shape by simply altering the cam disc 412 and providing surfaces thereon to control the inward and outward movement of the oscillatable cutting tool supporting arm in accordance with the work piece contour desired.

It is to be understood that the forms of the invention herewith shown and described are to be taken as preferred embodiments of the same and that various changes may be made in the shape, size and arrangement of parts without departing from the spirit of the invention or the scope of the subjoined claims.

What I claim is:

1. An automatic machine tool, comprising a rotary feed head for rotating and feeding rod stock, a chuck carried by the feed head to rotate therewith and support said stock, radially movable cutting means mounted in close proximity to said feed head and arranged in fixed relation relative to said chuck, means for moving said cutting means toward and away from said rod stock during rotation and longitudinal feeding thereof to form various diameters thereon, means for rotating said rotary feed head, means controlled by the feeding movement of said stock a predetermined distance for interrupting the longitudinal feeding motion of said rod stock and means controlled by the rotation of said feed head a predetermined angular distance for starting stock feeding movement and controlling said cutting tool moving means.

2. An automatic machine tool, comprising a rotary feed head for simultaneously rotating and feeding rod stock in a longitudinal direction, a collet carried by said rotary feed head for frictionally gripping said stock, cutting means mounted in juxtaposed relation to said rotary feed head arranged in a longitudinally fixed position with respect to said collet and movable toward and away from said stock during the feeding movement thereof to form various diameters thereon, means for moving said cutting means, means controlled by the longitudinal movement of said stock for effecting operation of said last-named means and for interrupting feeding movement of said rod stock at certain intervals after it has advanced a predetermined distance, and means controlled by the relation of said feed head through a predetermined angular distance for starting longitudinal feeding movement of said stock.

3. An automatic machine tool, comprising a rotary feed head for simultaneously rotating and feeding rod stock in a longitudinal direction, a collet carried by said rotary feed head for frictionally gripping said stock, cutting means mounted in juxtaposed relation to said rotary feed head arranged in a longitudinally fixed position with respect to said collet and movable toward and away from said stock during the feeding movement thereof to form various diameters thereon, means controlled by the advancement of said stock a predetermined distance for moving said cutting means, means for interrupting feeding movement of said rod stock at certain intervals after it has advanced a predetermined distance, and means also controlled by the advancement of said stock along a predetermined distance for limiting inward movement of said cutting means to position said cutting means at various distances with respect to the longitudinal center of said rod stock to form said various diameters.

4. An automatic machine tool, comprising a rotary feed head for simultaneously rotating and feeding rod stock in a longitudinal direction along a pathway, a collet carried by said rotary feed head for frictionally gripping said stock, cutting means mounted in juxtaposed relation to said collet in a fixed position along said pathway and movable toward and away from said stock during the feeding movement thereof to form various diameters thereon, means operable upon rotation of said feed head for moving said cutting means toward and away from said stock, means controlled by the longitudinal movement of said stock for interrupting feeding movement of said rod stock at certain intervals after it has advanced a predetermined distance, and means controlled by the rotation of said feed head through a predetermined angular distance for starting feeding movement of said stock a predetermined time interval after each interruption of said feeding movement.

5. An automatic machine tool, comprising a rotary feed head for simultaneously rotating and feeding rod stock in a longitudinal direction along a pathway, a collet carried by and rotatable with said rotary feed head for frictionally gripping said stock, cutting means mounted in juxtaposed relation to said collet in fixed relation with respect to said pathway and movable toward and away from said stock during the feeding movement thereof to form various diameters thereon, means operable upon rotation of said feed head through a predetermined angular distance for moving said cutting means, means controlled by the movement of said stock along said pathway for interrupting feeding movement of said rod stock at certain intervals after it has advanced a predetermined distance, means controlled by rotation of said feed head for starting longitudinal feeding movement of said stock a predetermined time interval after each interruption of said feeding movement, and means also controlled by the movement of said stock to a predetermined position along said pathway for locking said starting means out of operation during the parting of said stock.

6. An automatic machine tool, comprising a machine bed having a frame structure, a rotary feed head for receiving and rotating rod stock, means carried by the feed head for feeding said stock in a longitudinal direction along a pathway, means for controlling the last-mentioned means for interrupting said feeding means after said stock has been fed predetermined distances, cutting means mounted in close proximity to the feed head for operation on the surface of said stock, means for moving said cutting means radially toward and away from said stock for forming various diameters on said stock during longitudinal feeding movement thereof, intermediate means operable upon movement of said stock along said pathway for controlling said last-named means and means for rotating said feed head.

7. An automatic machine tool for generating surfaces of various diameters on rod stock, comprising a feed head for rotating said stock about its axis and feeding said stock in a longitudinal direction along a pathway, a cutting tool positioned in a fixed relation with respect to said pathway in close proximity to the feed head for operation on the surface of said stock during longitudinal feeding movement of said stock, said cutting tool being supported for radial movement with respect to the axis of said stock, a cam shaft, a series of cams on said cam shaft, means drivingly connecting said feed head to said cam shaft, clutch means interposed in said driving connection, one of said cams being adapted to move said cutting tool in a radial direction to form the desired contour on the stock, another of said cams being adapted to control the longitudinal feeding movement of said rod stock and means controlled by the movement of said stock along said pathway predetermined linear distances for clutching and declutching said clutch means.

8. An automatic machine tool for generating surfaces of various diameters on rod stock, comprising a feed head for rotating said stock about its axis and feeding said stock in a longitudinal direction along a pathway, a cutting tool positioned in fixed relation to said pathway in close proximity to the feed head for operation on the surface of said stock during longitudinal feeding movement of said stock, said cutting tool being supported for radial movement with respect to the axis of said stock, a series of cams, means drivingly connecting said series of cams to said feed head to rotate therewith, clutch means interposed in said driving connection, one of said cams being adapted to move said cutting tool in a radial direction to form the desired contour on the stock, another of said cams being adapted to control the longitudinal feeding movement of said rod stock, and means governed by the longitudinal feeding movement of said stock predetermined distances along said pathway for controlling said clutch means, said cams being arranged to move the cutting tool and rod stock in timed relation to produce said desired contour surface on the rod stock.

9. An automatic machine tool for producing work pieces by generating surfaces of various diameters and shapes on rod stock, comprising a rotary feed head for rotating said stock about its axis, means carried by the rotary head for feeding said stock in a longitudinal direction, clutch means for drivingly connecting said stock feeding means to said rotary feed head, cutting means mounted in close relation to the rotary feed head movable in a radial direction for operation upon the surface of said stock during its feeding motion in said longitudinal direction, cam means for moving said cutting means in said radial direction to produce the desired contour on said stock, cam means for controlling said clutch means in timed relation to the radial movement of said cutting tool to permit said cutting tool to move inwardly and outwardly between its limits of movement during formation of said work piece and generation of said various surfaces on the rod stock, and means controlled by the longitudinal feeding of said stock a predetermined distance for disengaging said clutch and allowing positioning of said first-mentioned cam means to permit said cutting tool to move inwardly to the limit of its movement and part said work piece from said stock.

10. An automatic machine tool for producing work pieces by generating surfaces on rod stock of various diameters and shapes, comprising a rotary feed head for receiving and rotating the stock about its axis, feed rolls carried by said head for frictionally engaging the stock at diametrically opposed points to feed said stock in a longitudinal direction, reduction gearing drivingly connecting the feed rolls with the rotary head, a clutch interposed in said gearing to permit rotation of said stock independently of the feeding thereof by said feed rolls, cutting means mounted in close proximity to the feed head for movement in a radial direction, cam means for moving the cutting means in timed relation to the feeding of said stock, cam means for causing said clutch means to be moved to an operative position, cam means controlled by the longitudinal feeding of the stock a predetermined distance for controlling said clutch means moving cam means to move said clutch means to an inoperative position, and means for rotating said feed head.

11. An automatic machine tool for producing work pieces by generating surfaces on rod stock of various diameters and shapes, comprising a rotary feed head for receiving and rotating the stock about its axis, feed rolls carried by said head for frictionally engaging the stock at diametrically opposed points to feed said stock in a longitudinal direction, reduction gearing drivingly connecting the feed rolls with the rotary head, a clutch interposed in said gearing to permit rotation of said stock independently of the feeding thereof by said feed rolls, cutting means mounted in close proximity to the feed head for movement in a radial direction, cam means for moving the cutting means in timed relation to the feeding of said stock, cam means driven by the rotary feed head for engaging said clutch, cam means controlled by the feeding movement of said stock for controlling said clutch engaging cam means and disengaging said clutch, clutch means for drivingly connecting said rotary head to the cam means, means for disengaging said last-mentioned clutch means operable in timed relation with said cam means for moving said cutting means, and a second cam means controlled by the movement of the stock along a predetermined distance for latching and unlatching said last-mentioned clutch means to render said cutting means controlling cam means inoperable during certain periods of stock feed.

12. An automatic machine tool for producing work pieces by generating surfaces on rod stock of various diameters and shapes, comprising a rotary feed head for receiving and rotating the stock about its axis, feed rolls carried by said head for frictionally engaging the stock at diametrically opposed points to feed said stock in a longitudinal direction, reduction gearing drivingly connecting the feed rolls with the rotary head, a clutch interposed in said gearing to permit rotation of said stock independently of the feeding thereof by said feed rolls, cutting means mounted in close proximity to the feed head for movement in a radial direction, cam means for moving the cutting means in timed relation to the feeding of said stock, a cam shaft having a series of cams operable in unison, clutch means for drivingly connecting said rotary head to the cam shaft, one of said cams being operable for moving the cutting means in its radial direction, another of said cams being operable for engaging said first-mentioned clutch means and independent cam means controlled by the movement of said stock a predetermined distance for controlling both of said clutch means.

13. An automatic machine tool for producing work pieces by generating surfaces on rod stock of various diameters and shapes, comprising a rotary feed head for rotating said stock about its axis, feed means carried by the head for engaging said stock at diametrically opposed points for feeding the stock in a longitudinal direction, gearing drivingly connecting said feed means to the feed head, a clutch interposed in said gearing, back and front cutting means positioned for radial movement relative to the stock in close proximity to the feed head, adjustable stop means for limiting the inward radial movement of said cutting means, cam means for controlling said adjustable stop means, cam means for engaging said clutch means, and control link means engageable with the end of the rod stock for tripping and releasing said clutch means after said stock has been fed a predetermined longitudinal distance.

14. An automatic machine tool for producing work pieces by generating surfaces on rod stock of various diameters and shapes, comprising a rotary feed head for rotating said stock about its axis, feed means carried by the head for engaging said stock at diametrically opposed points for feeding the stock in a longitudinal direction, gearing drivingly connecting said feed means to the feed head, a clutch interposed in said gearing, back and front cutting means positioned for radial movement relative to the stock in close proximity to the feed head, adjustable stop means for limiting the inward radial movement of said cutting means, cam means for controlling said adjustable stop means, cam means for engaging said clutch means, control link means engageable with the end of the rod stock for tripping and releasing said clutch means after said stock has been fed a predetermined longitudinal distance, gearing drivingly connecting said feed head to said cam means, a second clutch means yieldingly urged in an inoperative position interposed in the gearing, and means controlled by the control link means for engaging said second clutch means to cause said cam means to rotate through a complete revolution during the formation of each work piece.

15. An automatic machine tool for producing work pieces from rod stock by generating thereon surfaces of various diameters, comprising a rotary feed head for rotating said stock about its axis, feed rollers carried by the feed head for feeding said stock in a longitudinal direction, gearing between the feed head and rollers for driving said rollers at a reduced speed, a clutch interposed in said gearing, a cam shaft having a series of cams arranged thereon, gearing connecting said feed head for rotating said cam shaft, a clutch interposed in said last-named gearing for interrupting rotation of said cam shaft after rotation thereof through a complete revolution, one of said cams being adapted to render said first-mentioned clutch operative to feed said stock simultaneously upon rotation of the feed head, a cutting tool movable in a radial direction with respect to the stock adapted for movement by another of said cams toward and away from said stock, adjustable stop means for limiting the inward movement of said cutting tool toward said stock operably controlled by another of said cams for positioning said stop means before inward movement of the cutting tool has been initiated, and additional cam means controlled by the feeding movement of the stock for controlling the operation of said clutches to cause said cutting tool to be moved to a new position after each revolution of said cam shaft.

16. An automatic machine tool for producing work pieces from rod stock by generating thereon surfaces of various diameters and shapes, comprising a rotary feed head for rotating said stock about its axis, feed rolls carried by the feed head for frictionally gripping and feeding said stock in a longitudinal direction, gearing drivingly connecting said head to the feed rollers, a feed clutch interposed in the gearing for normally interrupting said driving connection, a cutting tool mounted adjacent the feed head for radial movement to operate on the rod stock, a cam shaft having a series of cams, gearing drivingly connecting the feed head to the cam shaft, a clutch interposed in said gearing normally held in operative position to drive said cam shaft, one of said cams being adapted to move the cutting tool away from said stock, adjustable stop means for limiting the inward movement of said cutting tool, another of said cams being adapted to move said stop means to a new position prior to the inward movement of the cutting tool, another of said cams being adapted to engage the feed clutch to initiate feeding movement of the stock, means for disengaging said second-mentioned clutch after each revolution of said cam shaft, means for locking the first-mentioned clutch in its operative position, and a control link engageable with the end of the stock after said stock has advanced a predetermined distance to operate said second clutch engaging means and release said clutch locking means.

17. An automatic machine tool for producing work pieces from rod stock by generating thereon surfaces of various diameters and shapes, comprising a rotary feed head for rotating the stock about its axis, feed rolls carried by the feed head for frictionally gripping and feeding the stock longitudinally, gearing drivingly connecting said head to the feed rollers, a clutch interposed in said gearing normally holding said feed rolls out of driving engagement with the feed head, a cutting tool mounted adjacent said feed head for movement in a radial direction with respect to the stock for operation thereon, a cam shaft having a series of cams arranged thereon in various positions of control, gearing drivingly connecting said feed head to said cam shaft, a cam shaft clutch mounted on the cam shaft normally in a position for drivingly connecting said last-mentioned gearing and cam shaft, a latch lever for holding said clutch in its declutched position, one of said cams being positioned for moving the cutting tool in an outward radial direction and being shaped to move said cutting tool a corresponding amount to produce the desired surface contour on said stock, another of said cams being positioned to cause engagement of the feed clutch and initiate feeding movement of the rod stock, the remaining cam on said cam shaft being adapted to declutch said cam shaft clutch during predetermined angular movement of said cam shaft about a single revolution, means controlled by the feeding movement of the rod stock for releasing the feed clutch after the stock has advanced a predetermined linear distance, and means controlled by the feeding movement of said stock after being advanced a predetermined linear distance for tripping said latch lever thereby permitting movement of said cam shaft about a predetermined angular distance to control the sequence of the various cutting and feeding cycles of the machine tool in timed relation one to the other.

18. An automatic machine tool for generating surfaces of various diameters on rod stock, comprising a feed head for rotating said stock about its axis and feeding said stock in a longitudinal direction, a cutting tool positioned in close proximity to the feed head for operation on the surface of said stock during longitudinal feeding movement of said stock, said cutting tool being supported for radial movement with respect to the axis of said stock, means for moving said cutting tool in timed relation to the feeding movement of said stock to form the desired contour thereon, means for rotating said feed head, a stock-engaging member movable in synchronism with the longitudinal movement of said stock, and mechanism interconnecting said cutting tool moving means with said stock-engaging member and responsive to the movement of said member for timing the movement of said cutting tool moving means whereby to control the movement of said cutting tool in response to the feeding movement of said stock.

19. An automatic machine tool for generating surfaces of various diameters on rod stock, comprising a feed head for rotating said stock about its axis and feeding said stock in a longitudinal direction, a cutting tool positioned in close proximity to the feed head for operation on the surface of said stock during longitudinal feeding movement of said stock, said cutting tool being supported for radial movement with respect to the axis of said stock, cam means for moving said cutting tool in timed relation to the longitudinal feeding movement of said stock to generate the desired contour thereon, means for rotating said feed head, a stock-engaging member movable in synchronism with the longitudinal movement of said stock, and mechanism interconnecting said cutting tool moving cam means with said stock-engaging member and responsive to the movement of said member for timing the movement of said cam means whereby to control the movement of said cutting tool in response to the feeding movement of said stock.

20. An automatic machine tool for generating surfaces of various diameters on rod stock, comprising a feed head for rotating said stock about its axis and feeding said stock in a longitudinal direction along a pathway, a cutting tool positioned in fixed relation with respect to said pathway and in close proximity to the feed head for operation on the surface of said stock during longitudinal feeding movement of said stock, said cutting tool being supported for radial movement with respect to the axis of said stock, a cam shaft, a cam mounted on the cam shaft, a cam follower device engaging said cam and connected to said cutting tool for moving the cutting tool in said radial direction to form the desired contour on said stock, means for rotating said feed head, a stock-engaging member movable in synchronism with the longitudinal movement of said stock, and mechanism interconnecting said cam shaft with said stock-engaging member and responsive to the movement of said member for timing the movement of said cam shaft whereby to control the movement of said cutting tool in response to the feeding movement of said stock.

21. An automatic machine tool for producing work pieces by generating surfaces of various diameters and shapes on rod stock, comprising a rotary feed head for rotating said stock about its axis, means carried by the rotary head for feeding said stock in a longitudinal direction, clutch means for drivingly connecting said stock feeding means to said rotary feed head, a cutting tool mounted in close relation to the rotary feed head movable in a radial direction for operation upon the surface of said stock during its feeding motion in said longitudinal direction, cam means for moving said cutting tool in said radial direction to produce the desired contour on said stock, cam means for controlling said clutch means in timed relation to the radial movement of said cutting tool to permit said cutting tool to move inwardly and outwardly between its limits of movement during formation of said work piece and generation of said various surfaces on the rod stock, a stock-engaging member movable in synchronism with the longitudinal movement of said stock, and mechanism interconnecting said cutting tool moving cam means with said stock-engaging member and responsive to the movement of said member for timing the movement of said cam means whereby to control the movement of said cutting tool in response to the feeding movement of said stock.

KENNETH R. MALTBY.